Figure 1:
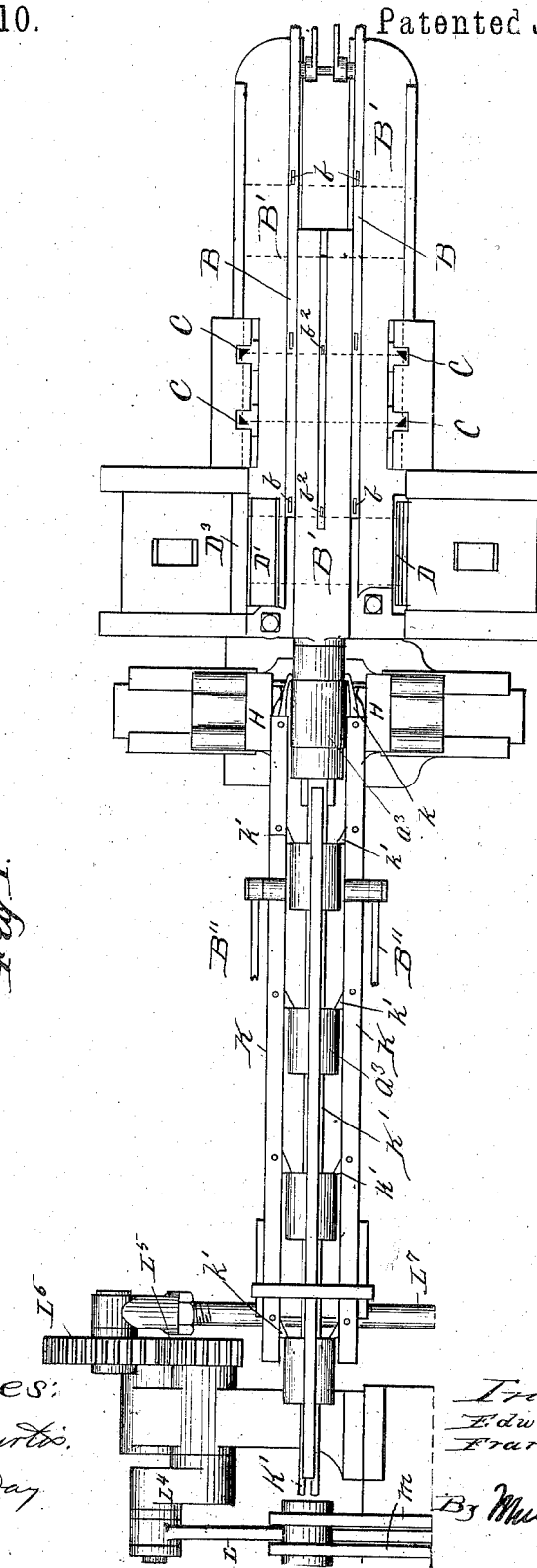

(No Model.) 20 Sheets—Sheet 1.

E. NORTON & F. M. LEAVITT.
MACHINE FOR MAKING CANS.

No. 498,810. Patented June 6, 1893.

Witnesses:
Lew. E. Curtis.
H. M. Munday

Inventors:
Edwin Norton
Frank M. Leavitt.
By Munday, Evarts & Adcock
Their Attorneys (No Model.) 20 Sheets—Sheet 2.
E. NORTON & F. M. LEAVITT.
MACHINE FOR MAKING CANS.
No. 498,810. Patented June 6, 1893.
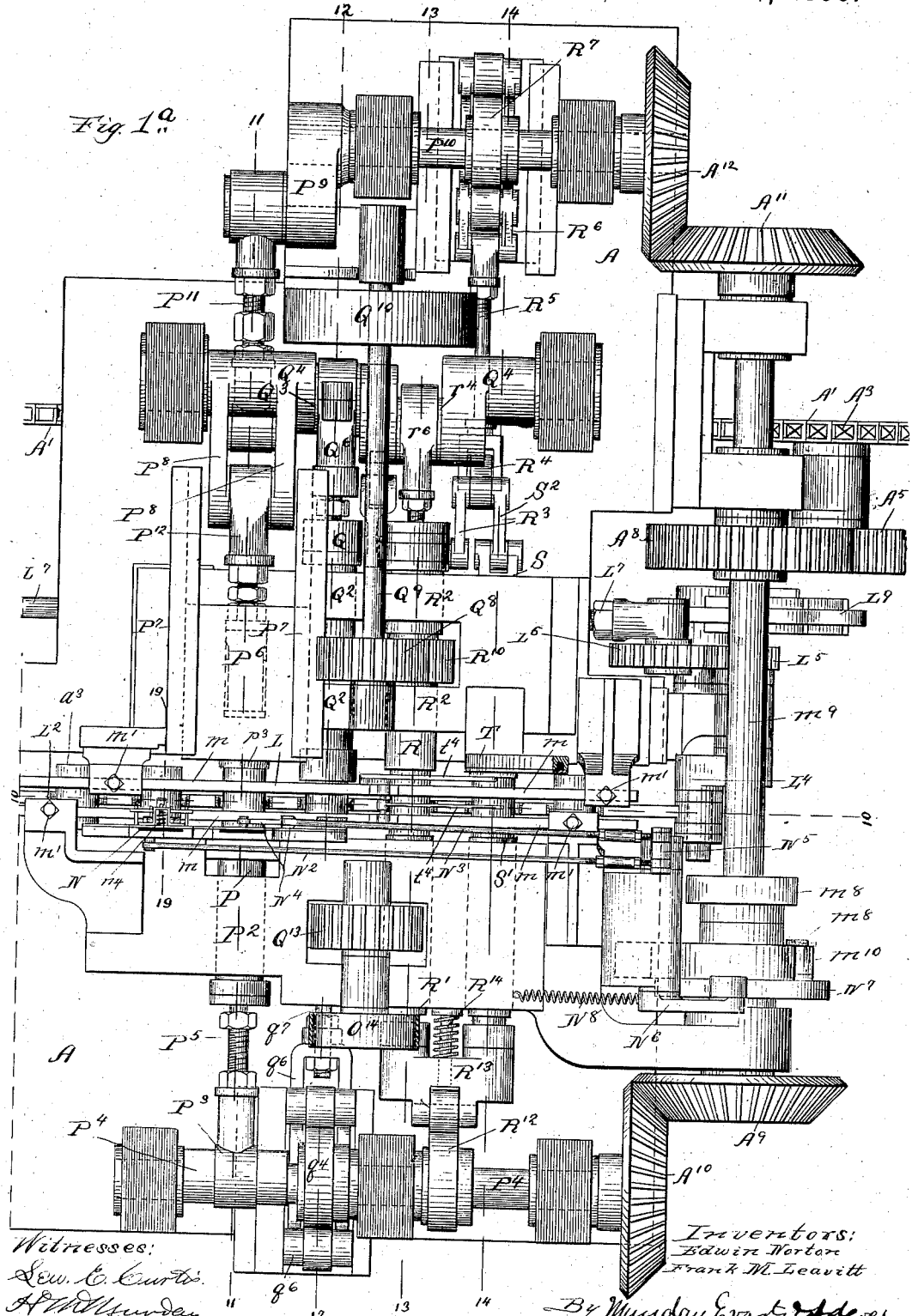
Fig. 1ᵃ
Witnesses:
Lew. E. Curtis.
H. M. Munday
Inventors:
Edwin Norton
Frank M. Leavitt
By Munday, Evarts & Adcock
Their Attorneys

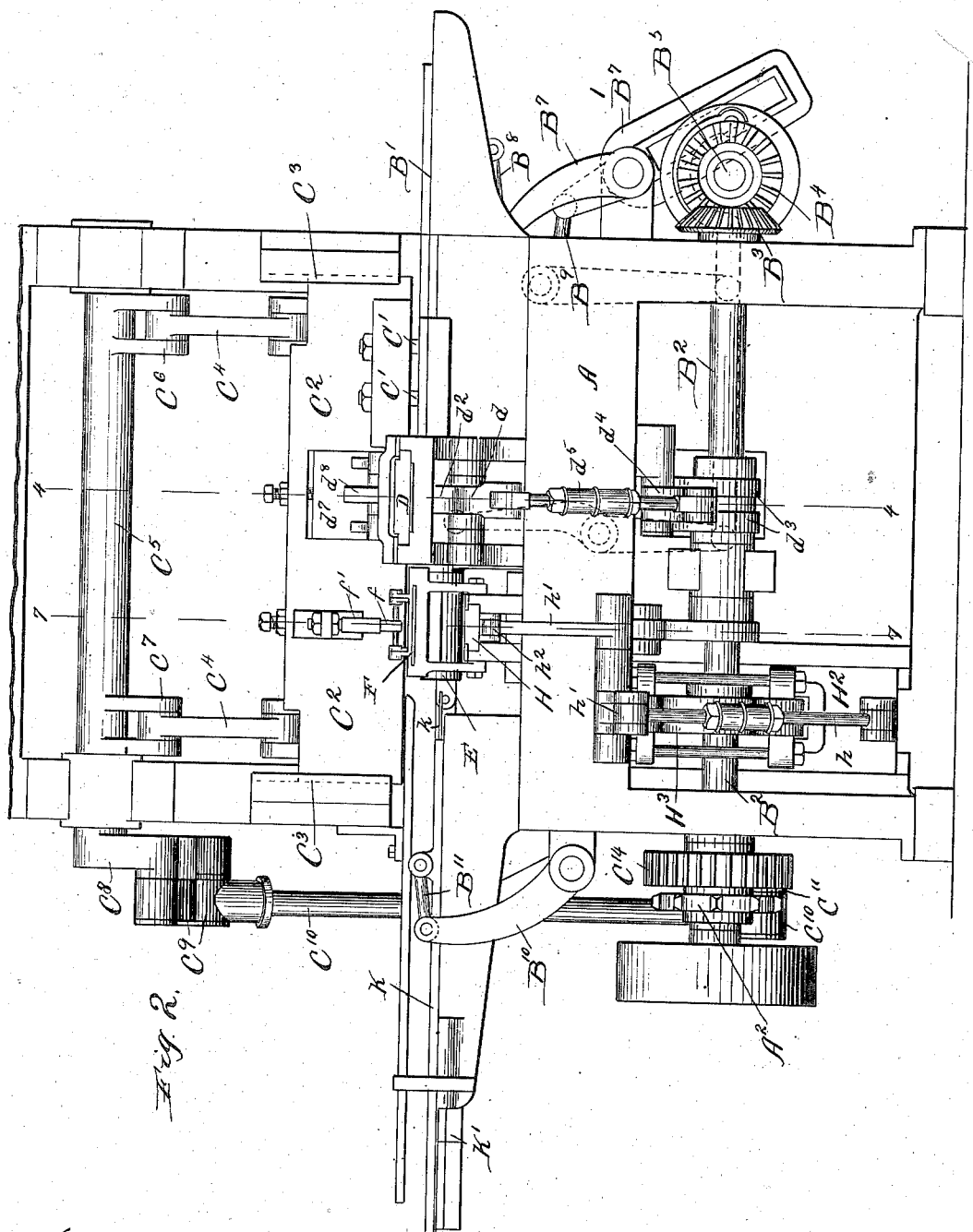

(No Model.)  20 Sheets—Sheet 4.
E. NORTON & F. M. LEAVITT.
MACHINE FOR MAKING CANS.
No. 498,810.  Patented June 6, 1893.
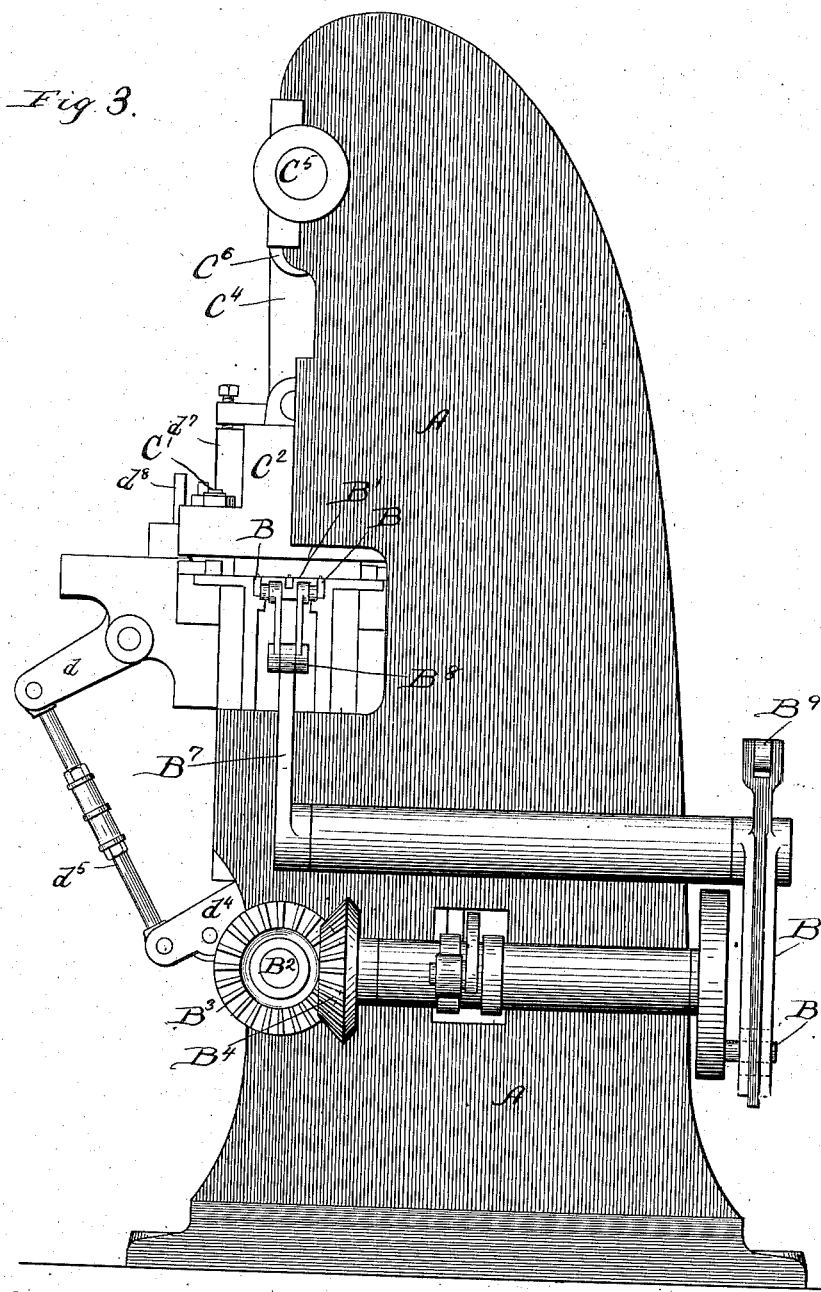

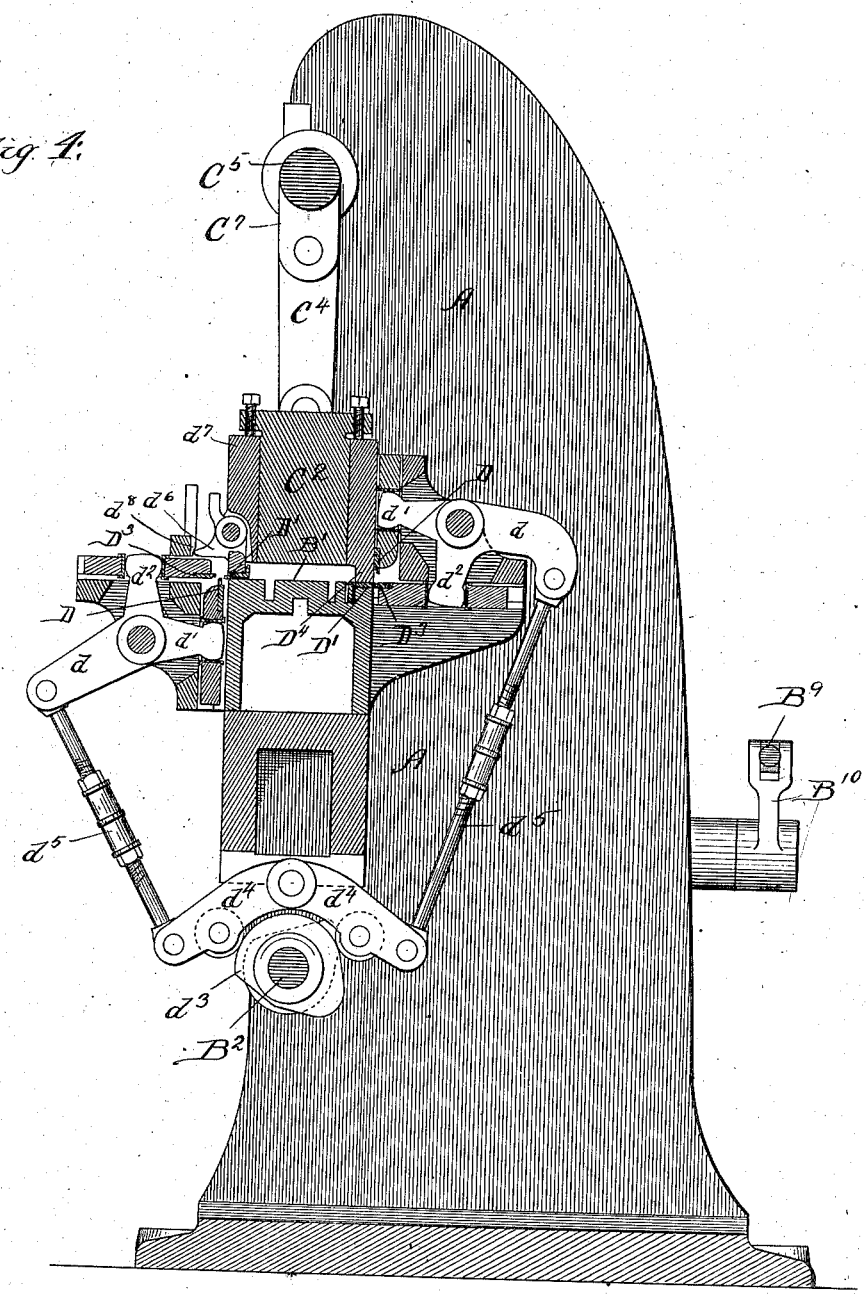

(No Model.) 20 Sheets—Sheet 6.

E. NORTON & F. M. LEAVITT.
MACHINE FOR MAKING CANS.

No. 498,810. Patented June 6, 1893.

Witnesses:
Lew. E. Curtis.
H. W. Munday

Inventors:
Edwin Norton
Frank M. Leavitt
By Munday, Evarts & Adcock
their Attorneys.

(No Model.)  20 Sheets—Sheet 7.

E. NORTON & F. M. LEAVITT.
MACHINE FOR MAKING CANS.

No. 498,810. Patented June 6, 1893.

Witnesses:
Geo. E. Curtis.
H. M. Munday.

Inventors:
Edwin Norton
Frank M. Leavitt
By Munday, Evarts & Adcock
their Attorneys (No Model.) 20 Sheets—Sheet 8.

E. NORTON & F. M. LEAVITT.
MACHINE FOR MAKING CANS.

No. 498,810. Patented June 6, 1893.

Witnesses:
Lew. E. Curtis
H. W. Munday

Inventors:
Edwin Norton
Frank M. Leavitt
By Munday, Evarts & Adcock
their Attorneys.

(No Model.) 20 Sheets—Sheet 12.

E. NORTON & F. M. LEAVITT.
MACHINE FOR MAKING CANS.

No. 498,810. Patented June 6, 1893.

Witnesses:
Geo. E. Curtis
H. W. Munday

Inventors:
Edwin Norton
Frank M. Leavitt
By Munday, Evarts & Adcock
their Attorneys (No Model.) 20 Sheets—Sheet 13.

E. NORTON & F. M. LEAVITT.
MACHINE FOR MAKING CANS.

No. 498,810. Patented June 6, 1893.

Witnesses:
Geo. C. Curtis
H. M. Munday

Inventors:
Edwin Norton
Frank M. Leavitt
By Munday, Evarts & Adcock
their Attorneys

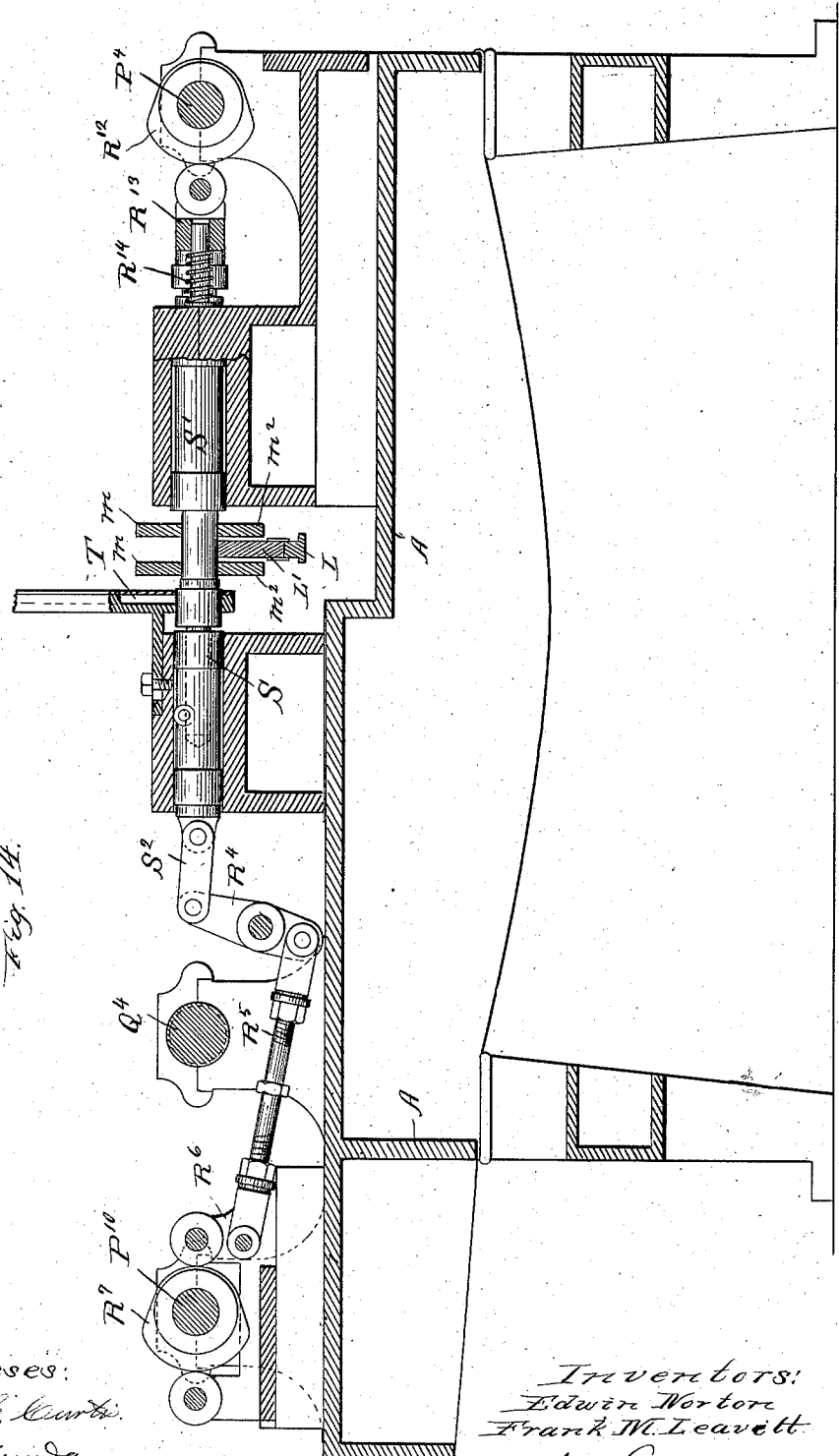

(No Model.) 20 Sheets—Sheet 15.
E. NORTON & F. M. LEAVITT.
MACHINE FOR MAKING CANS.
No. 498,810. Patented June 6, 1893.
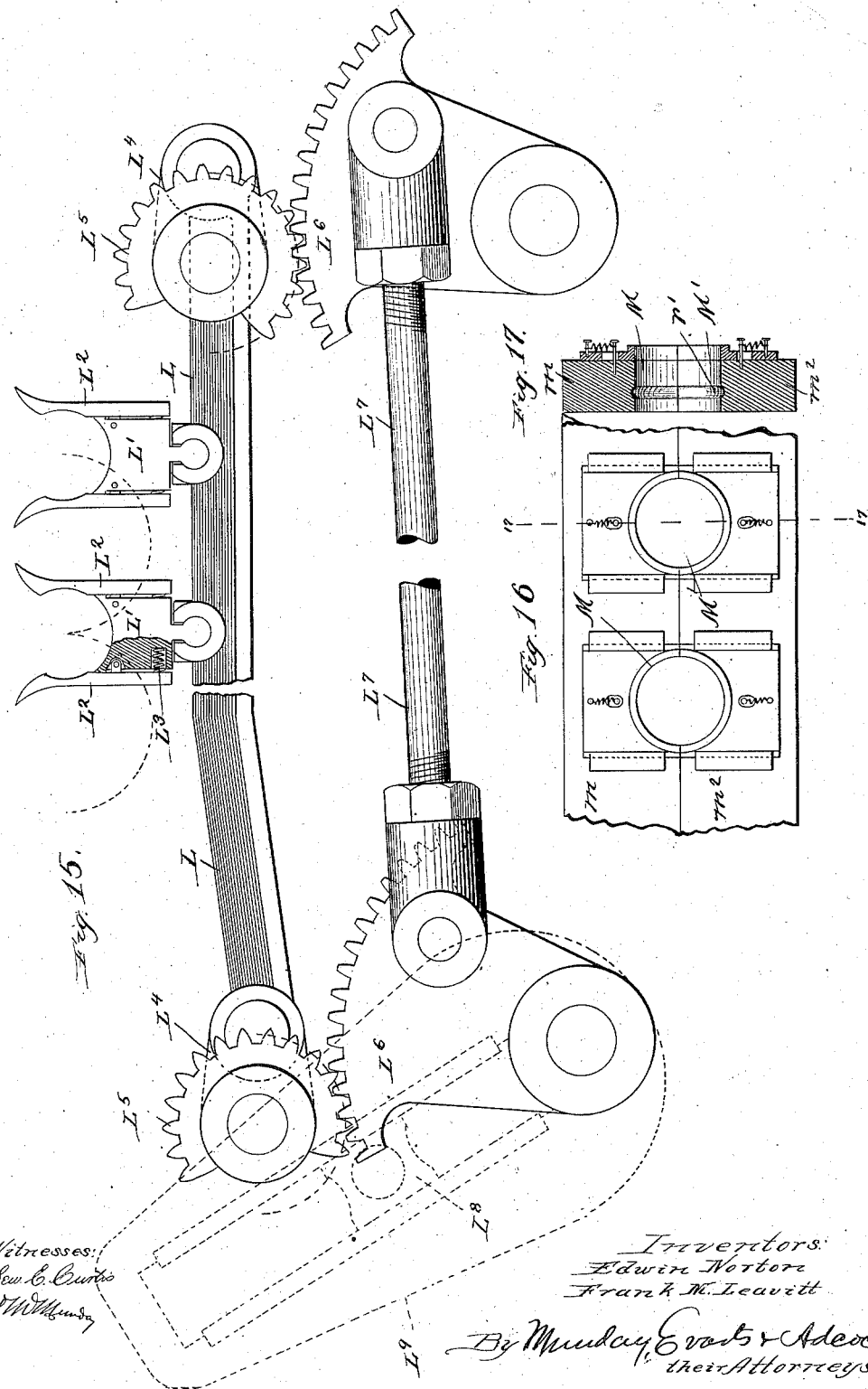

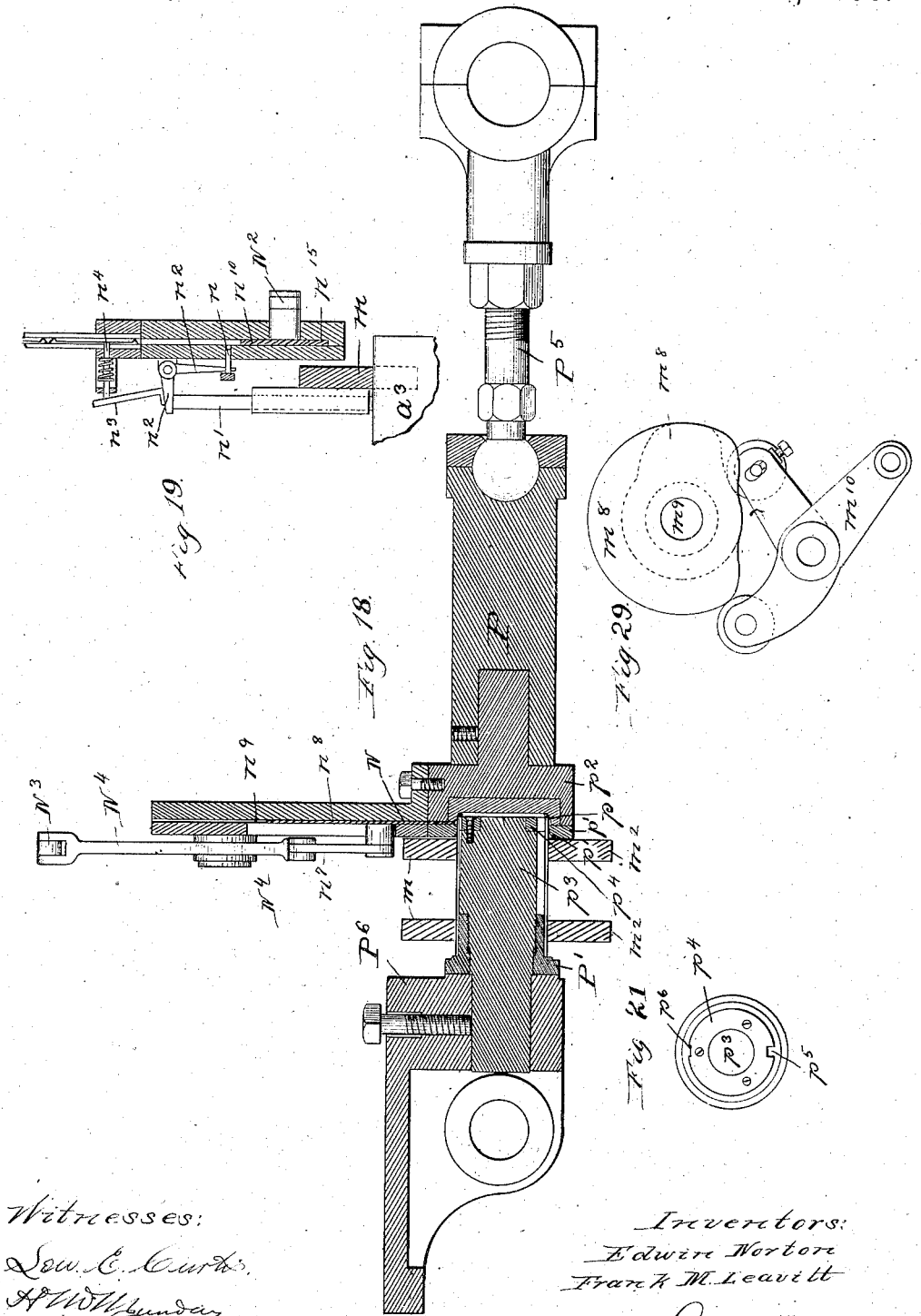

(No Model.) 20 Sheets—Sheet 17.

E. NORTON & F. M. LEAVITT.
MACHINE FOR MAKING CANS.

No. 498,810. Patented June 6, 1893.

Witnesses:
Lew. E. Curtis.
H. M. Munday

Inventors:
Edwin Norton & Frank M. Leavitt
By Munday, Evarts & Adcock
their Attorneys (No Model.) 20 Sheets—Sheet 18.
E. NORTON & F. M. LEAVITT.
MACHINE FOR MAKING CANS.
No. 498,810. Patented June 6, 1893.
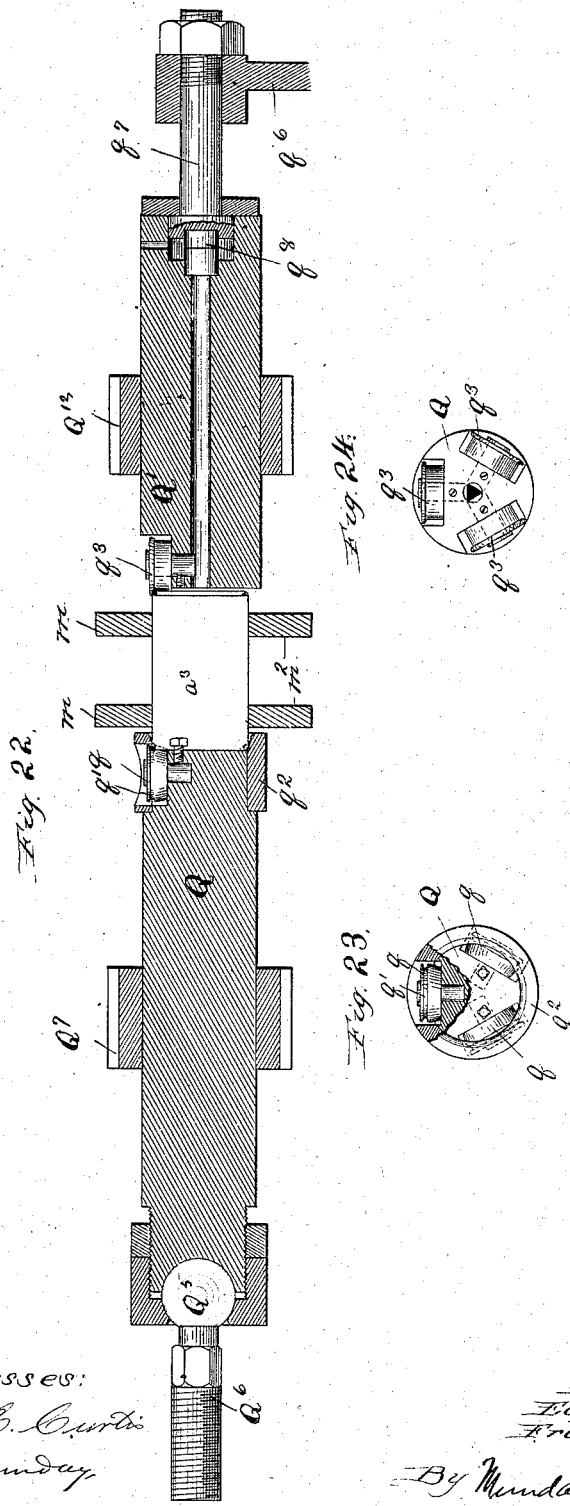
Witnesses:
Inventors:
Edwin Norton
Frank M. Leavitt
By Munday, Evarts & Adcock
their Attorneys (No Model.) 20 Sheets—Sheet 19.
E. NORTON & F. M. LEAVITT.
MACHINE FOR MAKING CANS.
No. 498,810. Patented June 6, 1893.
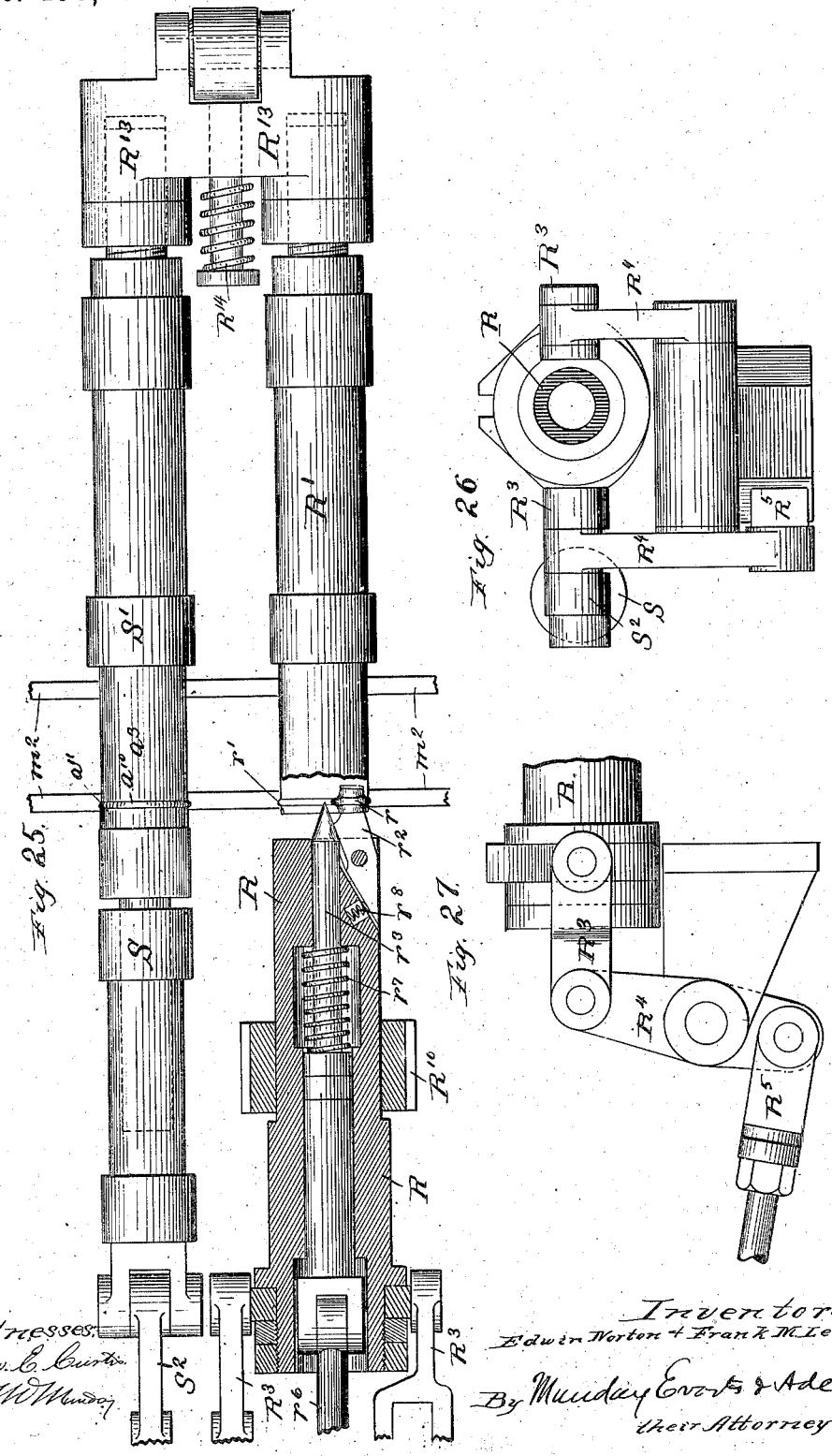

(No Model.) 20 Sheets—Sheet 20.
E. NORTON & F. M. LEAVITT.
MACHINE FOR MAKING CANS.
No. 498,810. Patented June 6, 1893.
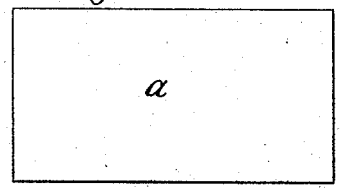
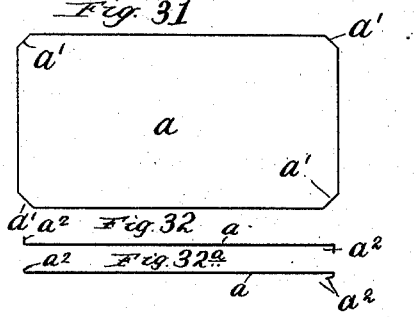
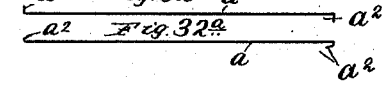
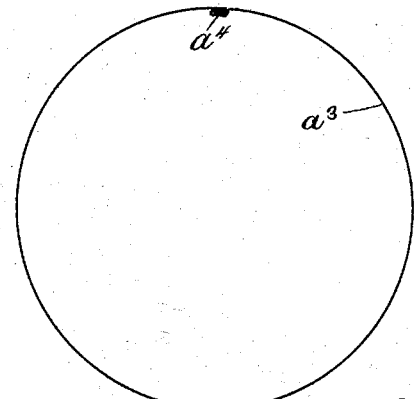
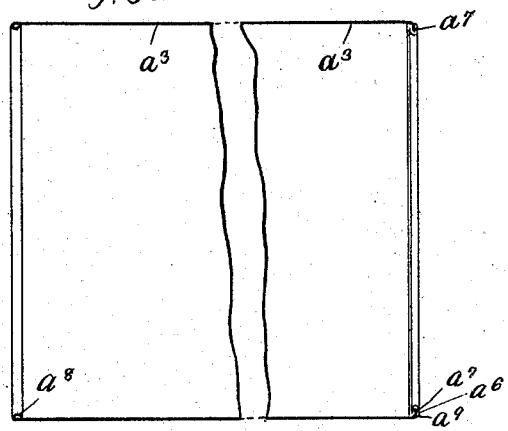
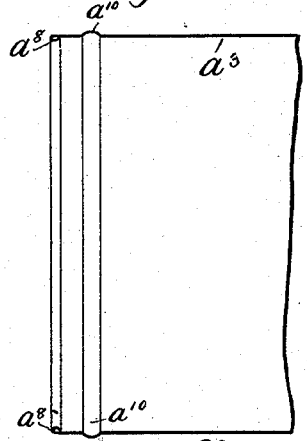
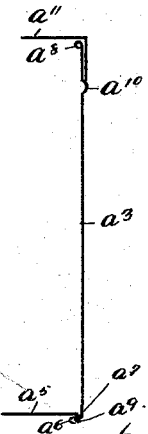
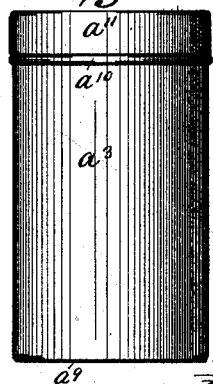
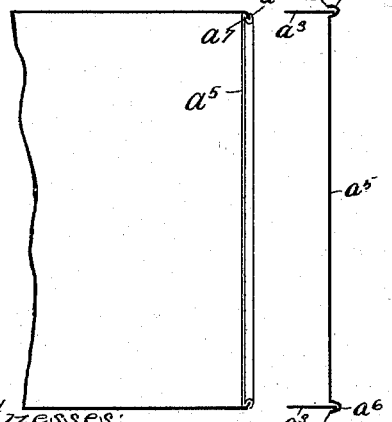
Witnesses:
Inventors.
Edwin Norton
Frank M. Leavitt
By Munday, Evarts & Adcock
their Attorneys.

UNITED STATES PATENT OFFICE.

EDWIN NORTON, OF MAYWOOD, ILLINOIS, AND FRANK M. LEAVITT, OF BROOKLYN, NEW YORK, ASSIGNORS TO SAID NORTON, AND OLIVER W. NORTON, OF CHICAGO, ILLINOIS.

MACHINE FOR MAKING CANS.

SPECIFICATION forming part of Letters Patent No. 498,810, dated June 6, 1893.

Application filed April 4, 1890. Serial No. 346,614. (No model.)

*To all whom it may concern:*

Be it known that we, EDWIN NORTON, residing in Maywood, in the county of Cook and State of Illinois, and FRANK M. LEAVITT, residing in Brooklyn, in the county of Kings and State of New York, citizens of the United States, have invented a new and useful Improvement in Machines for Making Cans, of which the following is a specification.

Our invention relates to the manufacture of sheet metal cans.

The object of our invention is to provide an automatic machine which will operate to both make the can body and apply the head or heads thereto. And the object is more particularly to provide a machine for automatically manufacturing that class of cans which are commonly known as baking-powder cans, the seams of which are usually formed without the use of solder. In this class of cans the side seam of the can body is formed by interlocked folds in the meeting edges of the can body blank. The bottom head of the can is secured to the can body by a crimped or folded joint. And the can body is provided with an external bead near its top to strengthen the same and form a shoulder for the slip cover to fit against. The upper edge of the can body is also wired or rolled inward for the purpose of making a smooth mouth for the can and also to further strengthen or stiffen the can body. And the raw external edge of the can body head at the lower end thereof, which is folded or seamed to the bottom of the can body is burnished to give this end of the can a smooth, neat finish.

By our new can making machine, all the different operations necessary to produce these baking-powder cans are performed automatically and rapidly and much time, labor and expense are saved in the manufacture of such cans.

In our invention the can body blank is automatically fed or delivered first to a corner clipping device or mechanism which operates to cut off the four corners of the blank, so that the upper and lower ends of the can body formed therefrom may be properly folded or wired. It is next automatically delivered to the can body forming device or mechanism by which the rectangular can body blank is formed into cylindrical shape and its meeting edges interlocked or folded together to produce the side seam of the can body. The can body forming mechanism may be of any suitable construction known to those skilled in the art, such for example as those shown and described in prior patents of the United States upon can body forming mechanism. The type of can body former which we prefer to use is of the character which operates to first form hooks upon the meeting edges of the blank, then form or wrap the blank around a horn and interlock such hooks and finally close them firmly together into the seam. Can body forming mechanisms of this type are shown and described, for example, in United States Patents Nos. 250,266 and 395,788. After the can body has thus been formed, it is next delivered automatically to a device or mechanism which operates to apply the bottom head or end to the can body. The same mechanism which applies the can head to the can body is preferably also employed to squeeze, crimp or seam the flanges of the can head and can body into an interlocked seam. This latter or seaming operation is effected by combining with the head applying mechanism, proper, an internal reciprocating mandrel which advances inside the can body and serves as an anvil or support inside the can body against which the seam is closed by the can head applying plunger. From this can heading or bottoming device the can body is automatically delivered by its carrier to a device or mechanism which operates to turn or roll the top or mouth edge of the can body inward to form the wire or roll at the mouth of the can. Simultaneously with this wiring or rolling operation the opposite or bottom end of the can is burnished by the burnishing tool or device. The burnishing tool consists of a wheel or roller mounted upon a revolving mandrel or clutch. The wiring or edge rolling device is of a similar construction except that the roller is furnished with a groove. The burnishing mandrel and the wiring mandrel revolve in opposite directions, so that the tendency of the one to revolve the can in its holder or carrier will counteract that of the other. From the wiring and burnishing devices the can is next automatically delivered to a device or mechanism which operates to form the bead near the upper end of the can body. This beading device consists preferably of a revolving mandrel which enters the mouth of the can and which is provided with a beading roller which is pressed out against the can by a wedge or other suitable mechanism mounted in or carried by the revolving mandrel. The can body holder, which surrounds the can on the outside at the time this beading operation is performed, is furnished with an annular groove to permit the beading roller to form the external bead in the can body. After the can has thus been beaded, it is next automatically delivered to the device or mechanism by which the slip cover or final head is automatically applied to the can body. The finished can is then discharged from the machine.

During the heading or bottoming, the wiring and burnishing, the beading, and the topping or cover applying operations, the can body is held, supported, sized and rounded by a series of opening and closing can body holders to each of which the can body is delivered in succession by the can body carrier.

Our invention consists in the novel devices and novel combinations and subcombinations of parts and devices herein shown and described and more particularly pointed out in the claims.

In the accompanying drawings which form a part of this specification, we have shown a machine embodying and suitable for use in practicing our invention. The particular machine shown in the drawings is one especially designed for making the particular form of can which is shown in the drawings. It will be understood however that our invention may be used in the manufacture of other kinds of cans than that shown by making the necessary mechanical changes to adapt it to the particular kind or shape of can desired to be made.

Figure 5:
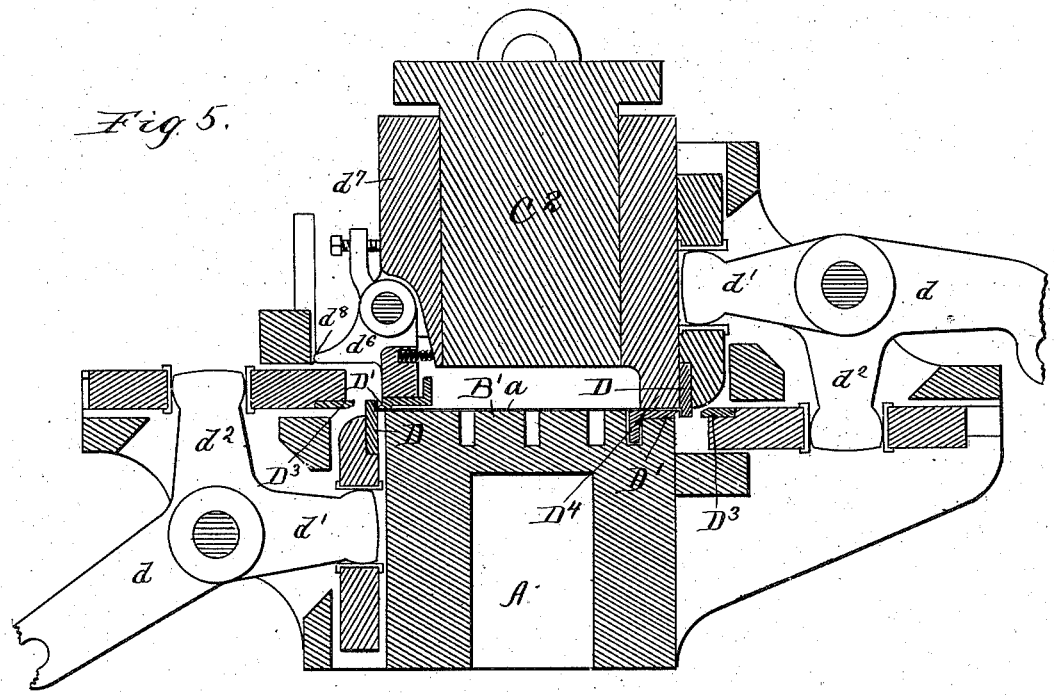
Figure 6:
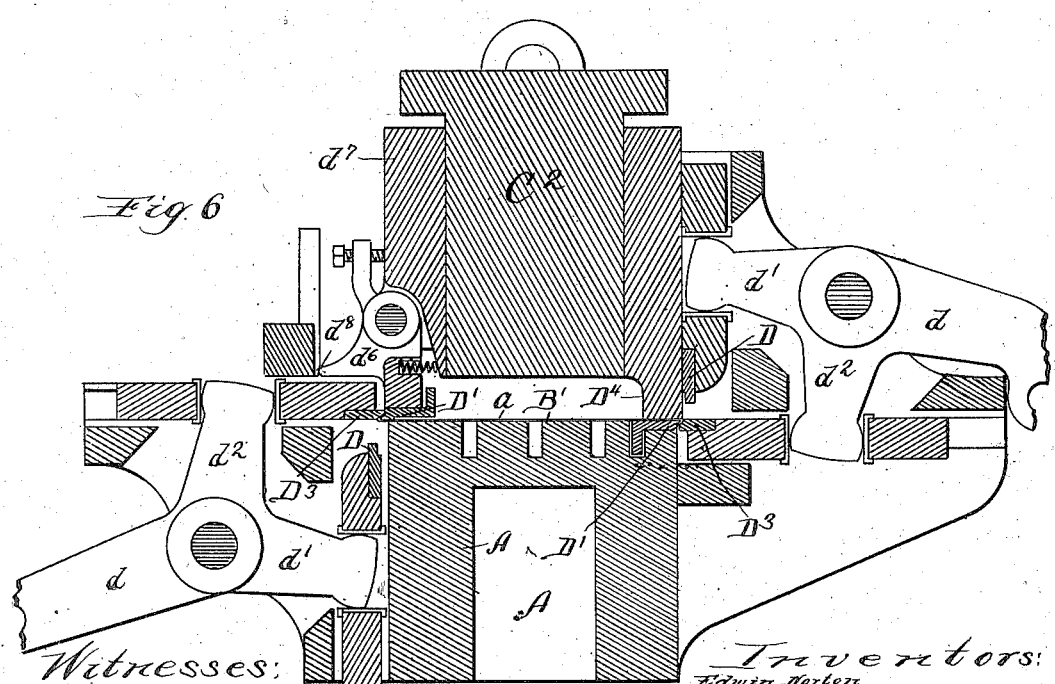
Figure 7:
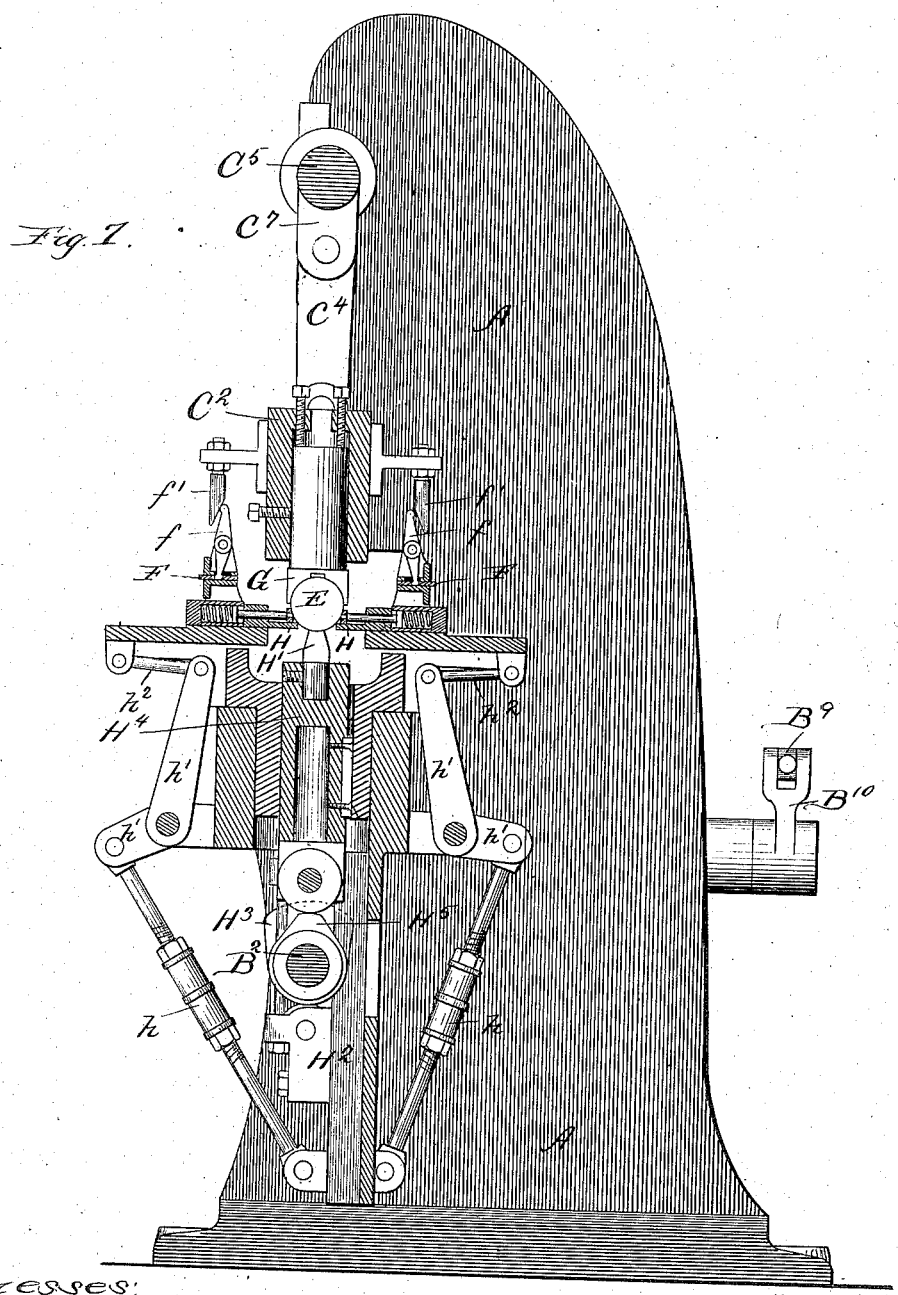
Figure 8:
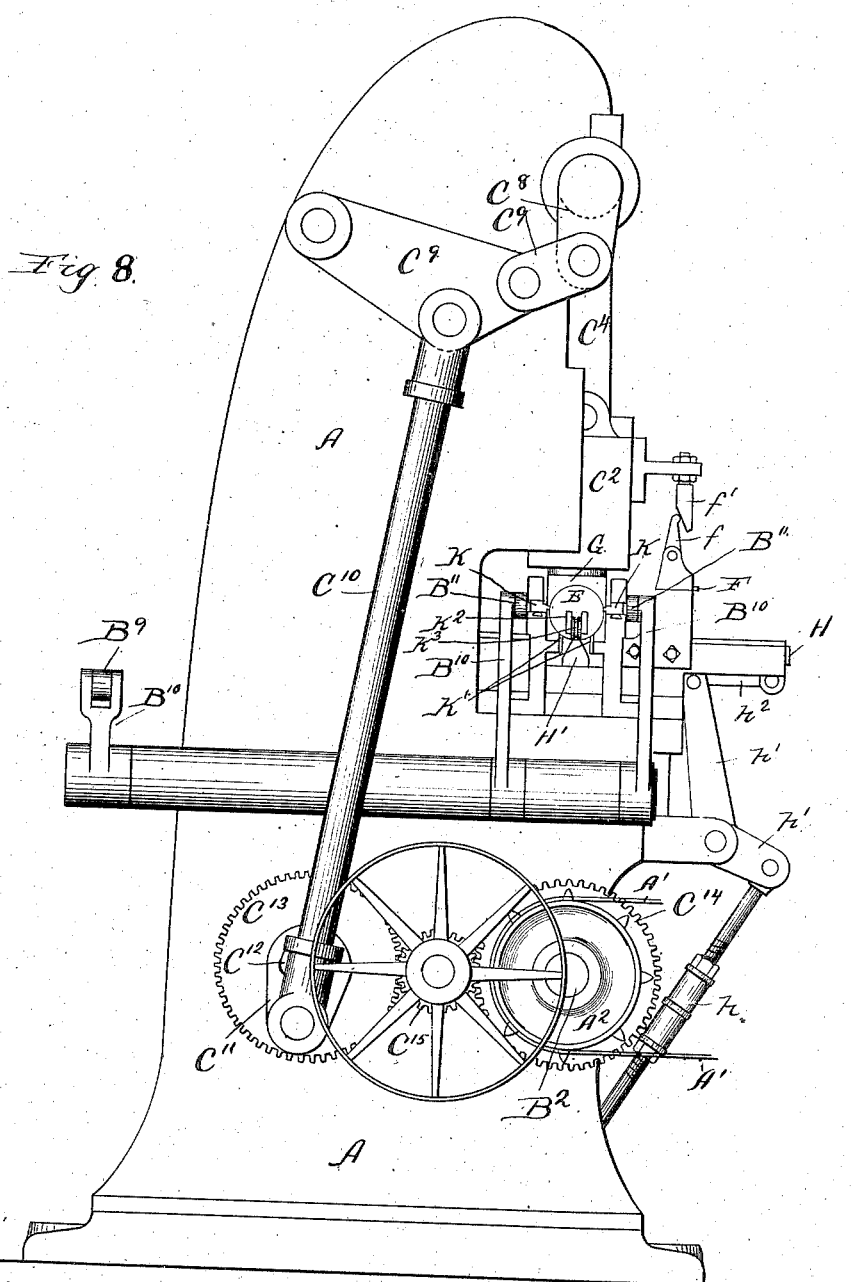
Figure 9:
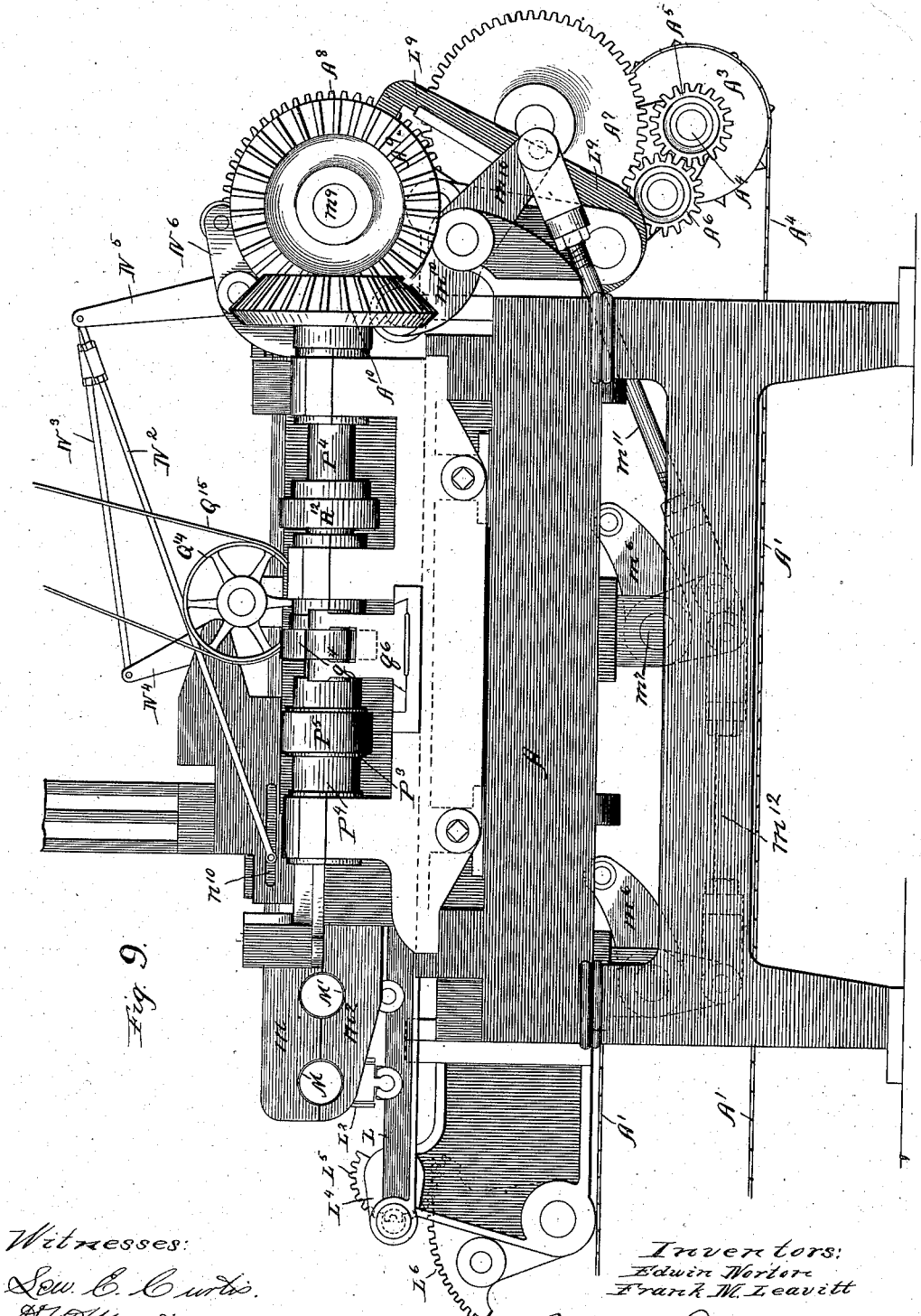
Figure 10:
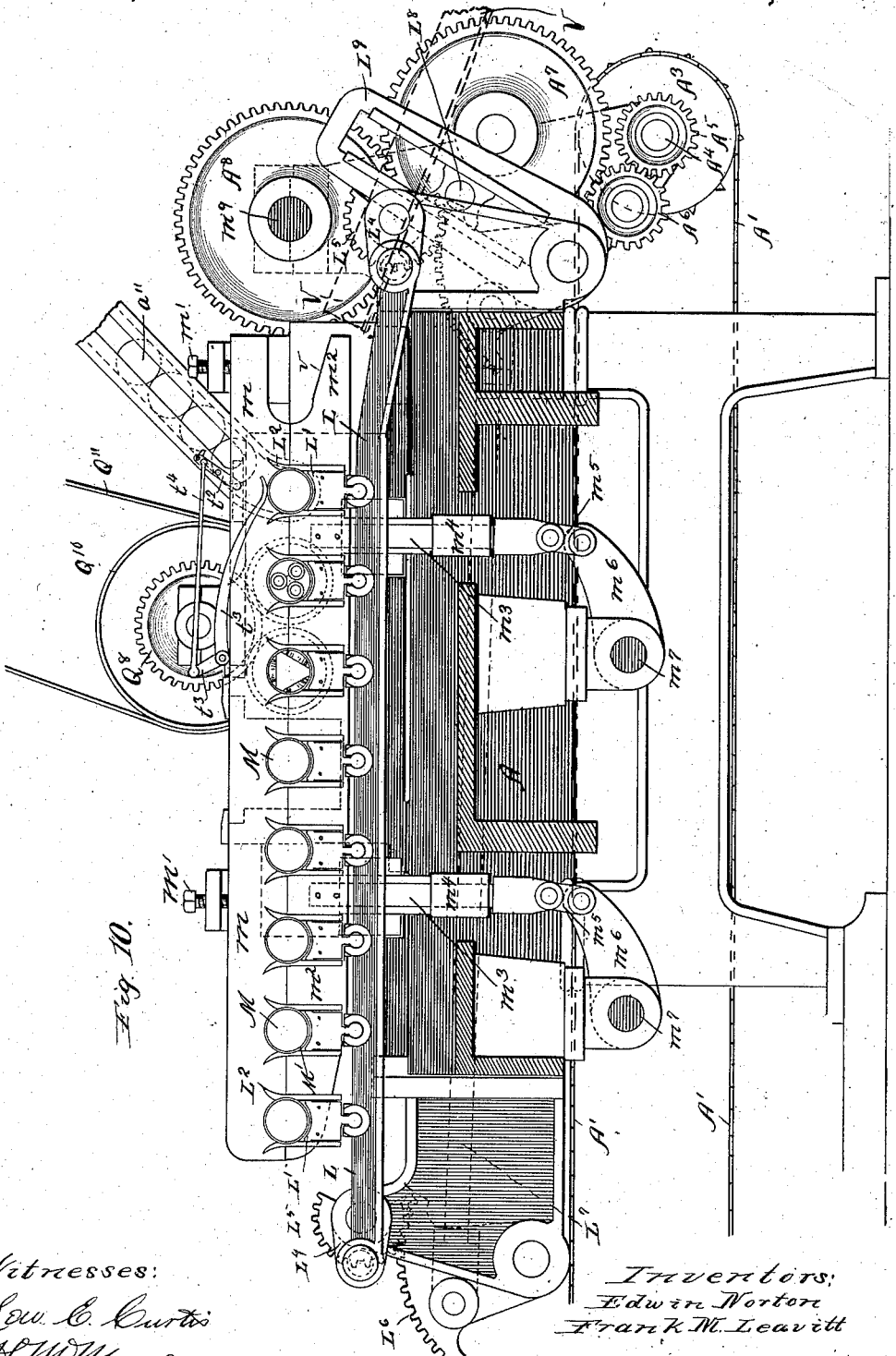
Figure 11:
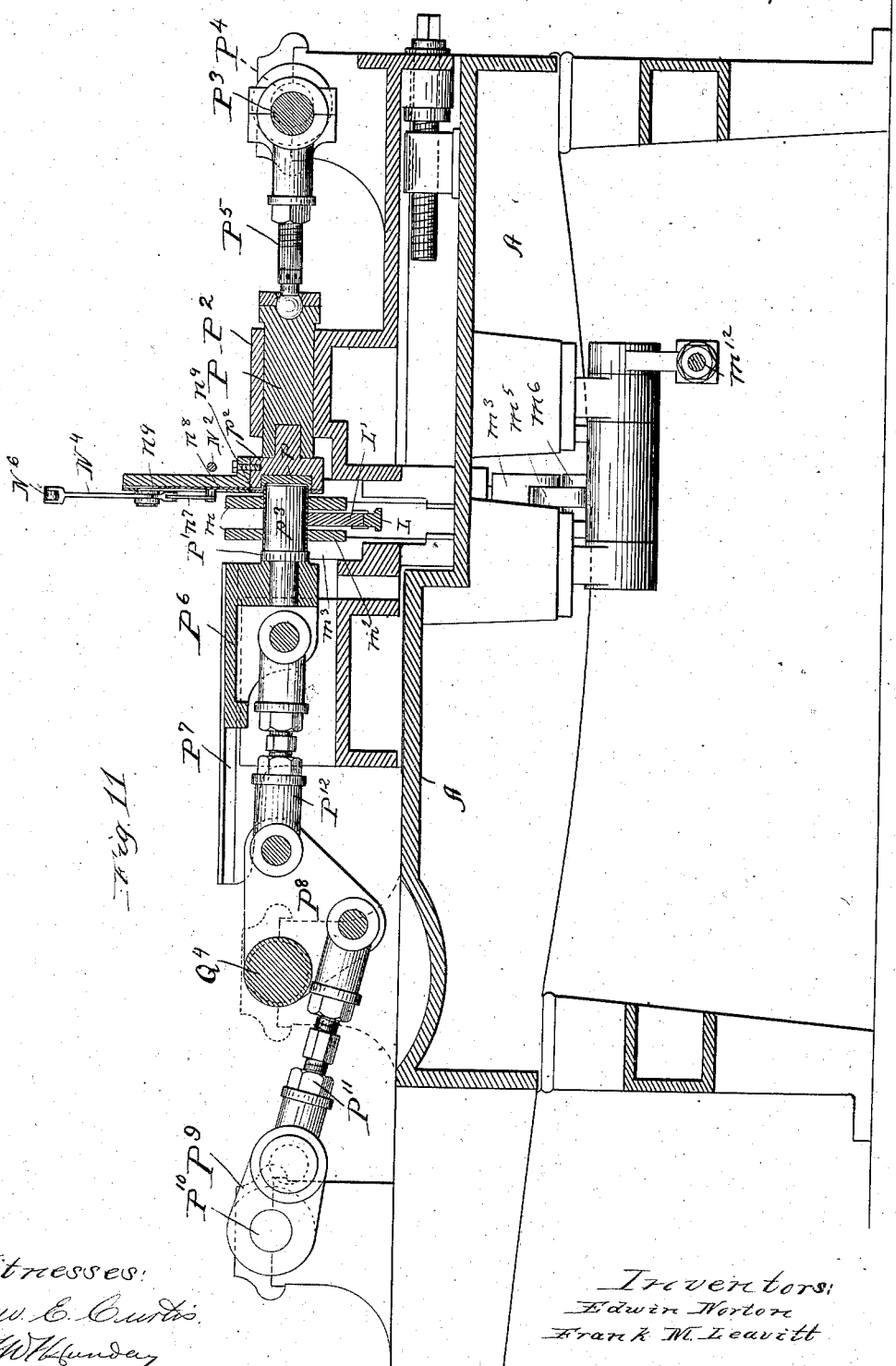
Figure 12:
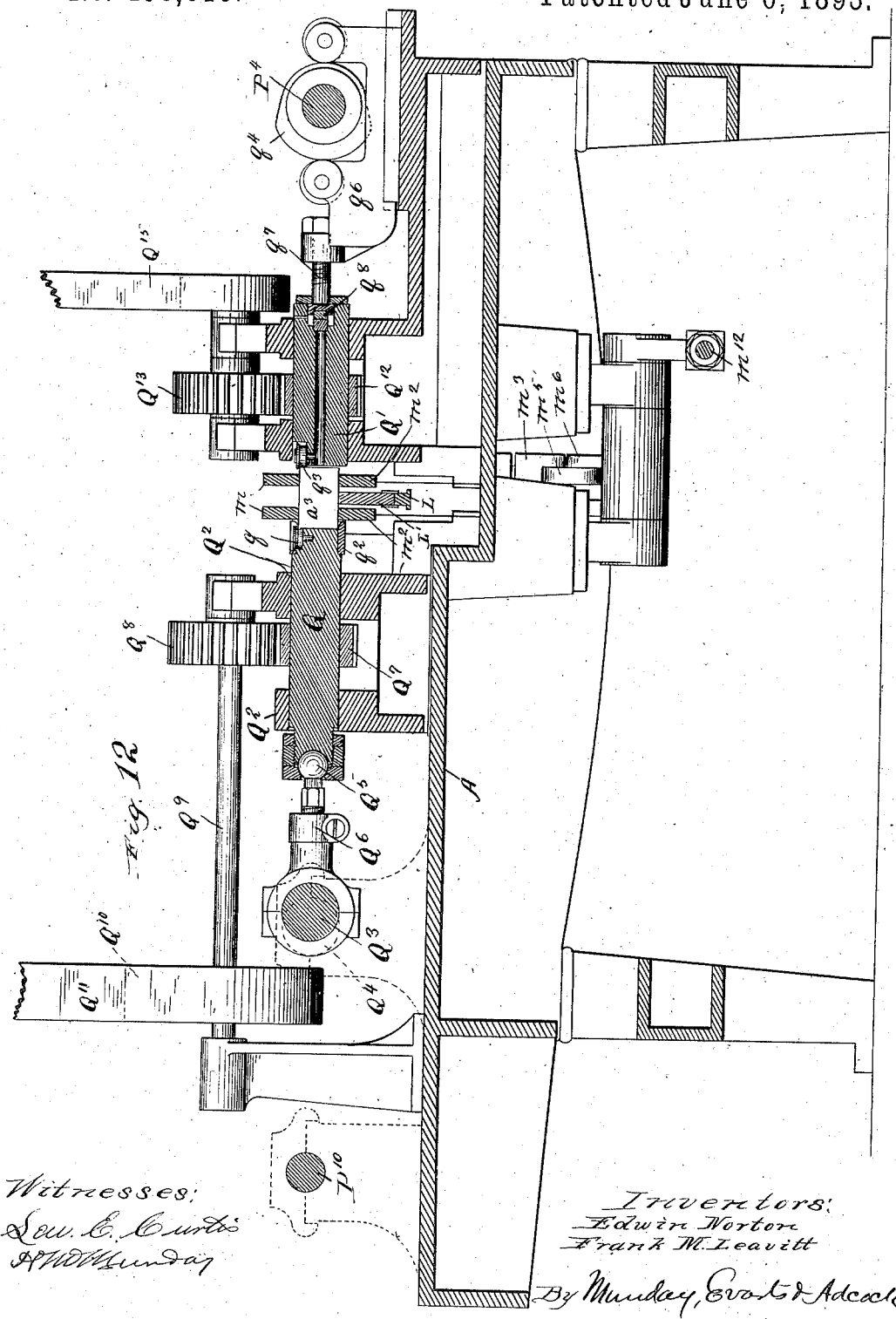
Figure 13:
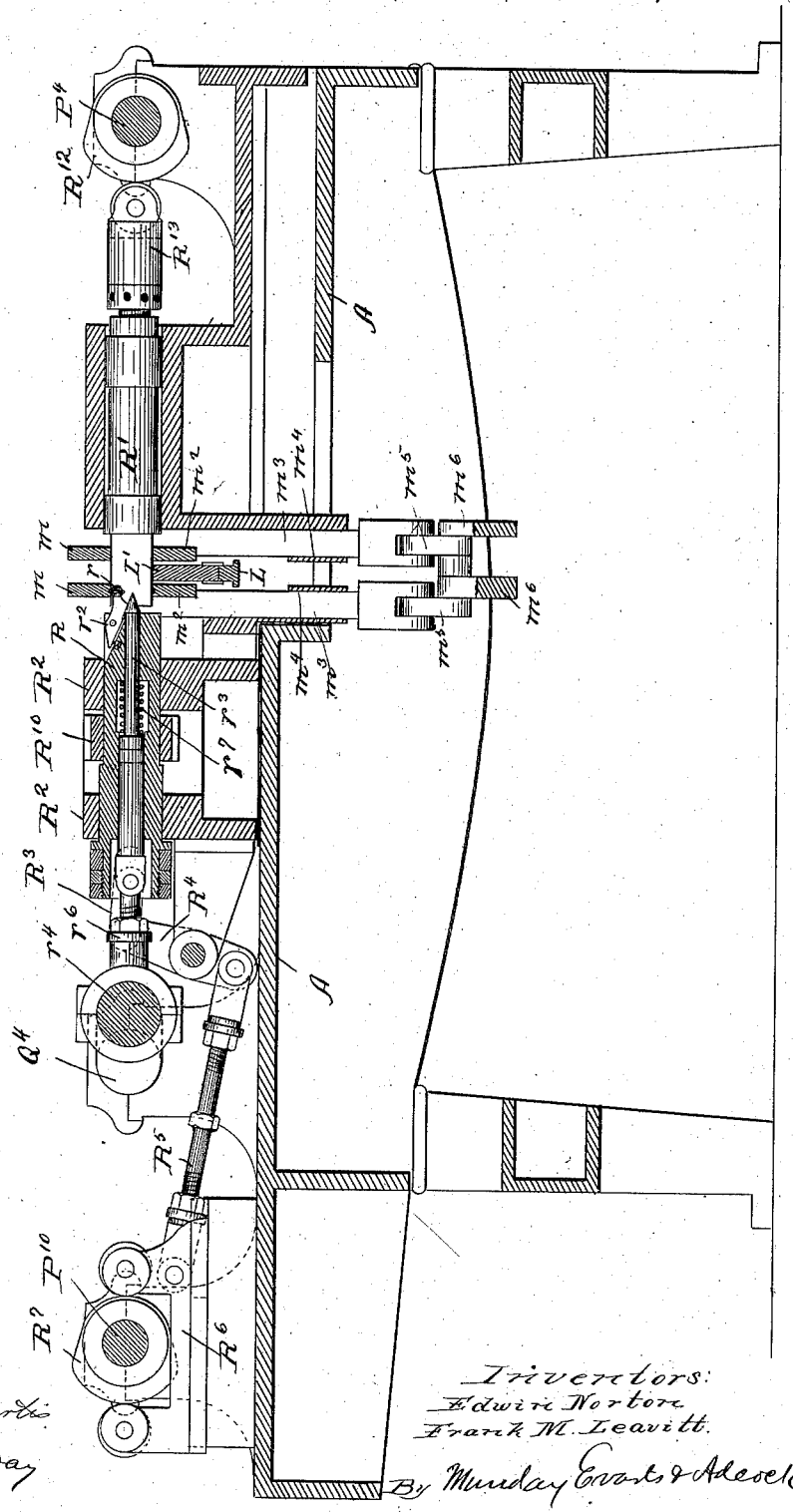
Figure 20:
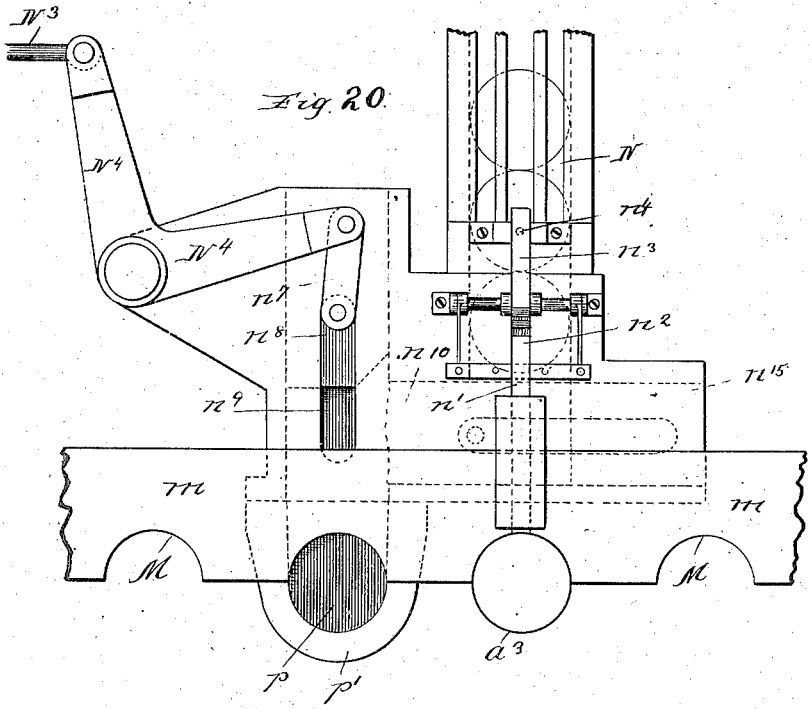
Figure 28:
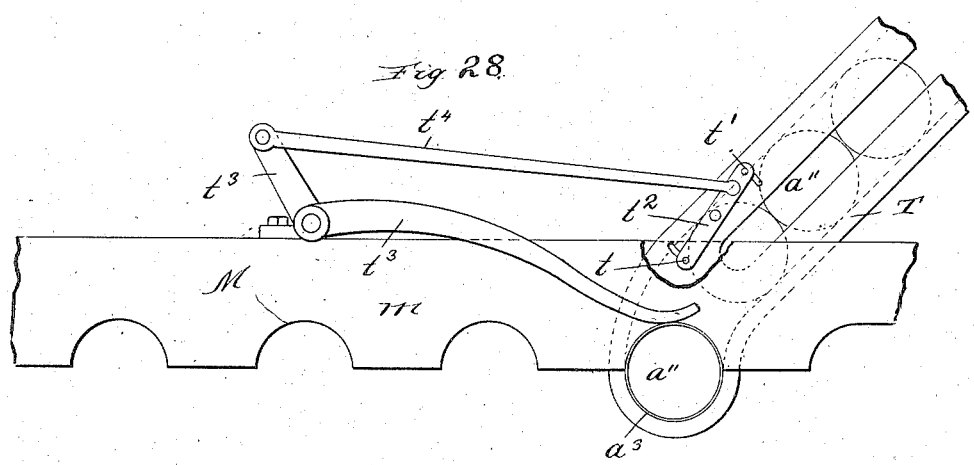

In the drawings Figures 1 and 1ª show a plan view of our new machine, in Fig. 1 the frame being omitted to better show the parts which would be concealed thereby. Fig. 1 shows the body former portion of the machine and Fig. 1ª the bottoming, wiring, burnishing, beading, and topping or cover applying devices. Fig. 2 is a front elevation of the body former portion of the machine. Fig. 3 is an end view of the same. Fig. 4 is a section on line 4—4 of Fig. 2. Figs. 5 and 6 are enlarged detail views of the edge folding or hook forming devices of the body former. Fig. 7 is a section on line 7—7 of Fig. 2 showing the mechanism for wrapping the body blank around the body former horn interlocking the hooks and closing the side seam. Fig. 8 is an end elevation of the body former device showing the opposite end from Fig. 3. Fig. 9 is a detail side elevation of the heading, wiring and beading mechanism. Fig. 10 is a section on line 10—10 of Fig. 1ª showing especially the can body carrier and the series of can body holders. Fig. 11 is a cross section on line 11—11 of Fig. 1ª, showing the device for applying and seaming the bottom of the can to the can body. Fig. 12 is a section on line 12—12 of Fig. 1ª showing the devices for wiring the top end and burnishing the bottom end of the can body. Fig. 13 is a section on line 13—13 of Fig. 1ª, showing the devices for beading the can body. Fig. 14 is a section on line 14—14 of Fig. 1ª showing the device for applying the slip cover or final head to the can body. Fig. 15 is an enlarged detail side elevation of the can body carrier device by which the can bodies are automatically and successively delivered to each of the series of can body holders. Fig. 16 is an enlarged detail elevation showing two of the series of can body holders and the operating bars by which the can body holders are opened and closed. Fig. 17 is a section on line 17—17 of Fig. 16, showing the particular construction of the can body holder which operates in conjunction or combination with the beading device. Fig. 18 is an enlarged partial section on line 11—11 of Fig. 1ª, showing the construction of the can head applying and seam closing device by which the bottom is secured to the can body. Fig. 19 is an enlarged detail section on line 19—19 of Fig. 1ª showing the can head feed device by which the can heads are automatically delivered in position in front of the heading plunger or piston, the operation of the can head feed device being controlled by the presence or absence of the can body in the can body holder which is axially in line with the heading plunger. This mechanism prevents the feeding of the can head unless there is a can body in position ready for the head to be applied. Fig. 20 is an enlarged detail side elevation of the can head feed mechanism shown in Fig. 19. Fig. 21 is a detail end view of the inside mandrel which is inserted in the can body at the time the bottom head is closed thereon. Fig. 22 is an enlarged detail section on line 12—12 of Fig. 1ª showing the wiring or edge rolling and the burnishing devices. Fig. 23 is a detail end view of the wiring or edge rolling tool. Fig. 24 is a detail end view of the burnishing tool. Fig. 25 is an enlarged detail plan view, partly in section, of the beading and heading mechanism. Fig. 26 is a detail end view showing the mechanism for operating the burnishing and heading plungers, and Fig. 27 is a side elevation of the same. Fig. 28 is a detail side elevation of the can top or cover feed mechanism. Fig. 29 is a detail view showing the cam and lever for operating the bars which actuate the opening and closing can body holders. Fig. 30 is a plan of the can body blank ready to be fed to the machine. Fig. 31 shows the same after its corners have been clipped. Fig. 32 shows the same after its edges have been once folded in the operation of forming the hooks. Fig. 32ª shows the blank after the edge folds or hooks have been formed thereon. Fig. 33 shows the can body after the hooks have been interlocked in the side seam closed. Fig. 33ª shows the bottom head applied ready to be crimped or folded with the end of the can body to form the end seam. Fig. 34 shows the end seam partially closed. Fig. 35 shows the can after the wiring or rolling and burnishing operations. Fig. 36 shows the can after the beading operation. Figs. 37 and 38 show the completed can with the slip cover applied.

In the drawings A represents the frame of the machine.

$a$ is the rectangular blank of which the can bodies are to be formed, the corners $a'$ of which are clipped, as shown in Fig. 31 by the first operation of the machine. The next operation is to form the edge folds or hooks $a^2$ upon the meeting edges of the blank. The next operation is to interlock the hooks $a^2$ and form the can body $a^3$, the hooks $a^2$ being interlocked and closed to form the side seam $a^4$. The can head or bottom $a^5$ is countersunk and provided with a flange $a^6$, as is clearly shown in Fig. 33ª. The bottom end of the can body is turned inward in the operation of seaming or crimping the bottom upon the can body, thus forming an internal flange $a^7$ upon the can body, as is clearly shown in Figs. 34 and 35. The next operation is to form the internal roll or wire $a^8$ at the top or mouth end of the can. At the same time this is done, the cut or raw edge $a^9$ of the can head flange $a^6$ is burnished, so as to give the bottom end of the can a smooth, neat finish, as is clearly indicated in Figs. 35, 37 and 38. The next operation is to provide the can body with the strengthening bead $a^{10}$ near its top or mouth, and the final operation is to apply the slip cover $a^{11}$.

The can body blank $a$ is automatically fed by a reciprocating blank feed device B furnished with pawls or projections $b$ along the table or guide way B'. The corners are clipped from the blank $a$ by means of stationary knives C operating in conjunction with the vertically reciprocating knives C' which are operated on or carried by the vertically moving cross head C². The blank feed passage or table B' is furnished with inclined stops or projections $b^2$ to hold the blank in position when the blank feeder or conveyer B recedes. The blank feeder B is operated from the main driving shaft B² of the machine by means of beveled gears B³ B⁴, cross shaft B⁵, having the wrist or crank pin B⁶, lever B⁷ and connecting link B⁸. The cross head C² is made to reciprocate in its vertical guide way C² from the main driving shaft B² by means of the connecting link C⁴, rock shaft C⁵ having the arms C⁶ C⁷, crank arm C⁸, toggle links C⁹ C⁹, pitman rod C¹⁰, crank arm C¹¹, on shaft C¹² which is connected by the gears C¹³ C¹⁴ C¹⁵ to the main driving shaft B². The next movement of the blank feeder B conveys the corner clipped blank to the edge folding or hook forming device.

The edge folding or hook forming device consists preferably of a number of opposing dies which operate first to bend one edge of the sheet up and the opposite edge down at right angles to the blank, as shown in Fig. 32, and subsequently to bend or incline the flanges, so formed inward to produce the hooks shown in Fig. 32ª. The right angle bend or fold is produced by the vertically moving dies or folders D D acting in conjunction with the opposing dies D' D' and the inward bend of the right angle flanges so produced is formed by the horizontally moving dies or folders D⁸ D³. A blank holder D⁴ operating in conjunction with the upper die D' serves to hold the blank smooth and rigid during the operation of the edge folders. The requisite movements are communicated to the dies or folders D D³ by a rocking lever $d$ having arms $d'$ $d^2$. The levers $d$ are actuated by a cam $d^3$ on the shaft B² by means of a lever $d^4$ and connecting links $d^5$. The blank holder D⁴ is moved up and down by the cross head C² with which it is connected. The upper die D' is given a side or inward movement to free it from the hook $a^2$ by means of a lever $d^6$ to which it is secured, which lever is pivoted to and carried by a block $d^7$ secured to the cross head C² and which lever is operated by a stationary cam $d^8$ as the cross head C² makes its upward movement. After the edge folds or hooks $a^2$ have thus been formed upon the meeting edges of the can body blank $a$, it is next fed forward by the can body feeder B into position over the former horn E, the outer edges of the blank being supported over the horn by movable guides F F which are withdrawn out of the way by levers $f$ operated by cams $f'$, carried by the cross head C², as the body former or folder G descends to wrap or fold the body blank around the horn E. The body former G is operated by the vertically moving cross head C² to which it is attached. The folding of the blank around the horn is completed and the hooks interlocked by the horizontally moving formers H H, which are actuated from the vertically moving slide H² by means of the connecting links $h$, bent levers $h'$ and connecting links $h^2$. The edge folds or hooks $a^2$ are closed together to form the side seam by the seam squeezing device H' which is actuated by the slide H⁴ by which it is carried. The slide H² is actuated by a cam H³ on the shaft B², and the slide H⁴ by the cam H⁵. The can body after being thus formed is extracted or delivered from the horn E by means of a reciprocating can body conveyer K having pawls $k$ which engage the rear end of the can body and operate to propel it forward. The can body conveyer K is operated from the lever B⁷ by link B⁹, lever B¹⁰ and link B¹¹. The conveyer K is provided with further pawls $k'$ which operate to propel the can body forward along the passage or way K' and deliver it to the transverse can body carrier L, by which the can bodies are delivered successively to the bottoming device, wiring and burnishing devices, the beading device and the topping or final heading device. The can body is held down on the way K' by the bar $K^2$ and prevented from revolving by the grooved rollers $K^3$ in the bar $K^2$.

As the construction of the can body former device or mechanism which we employ in or prefer to employ in our machine is fully shown and described in said last mentioned Patent No. 395,788, and as the particular construction of this can body former is not material to or part of this invention it is not necessary herein to give a more detailed description of the can body former portion of our new machine. This can body forming mechanism is now well known and familiar to those skilled in the art, and for a more complete description of the same reference is hereby made to said Patent No. 395,788. We also desire it to be understood that any other suitable and well known form of can body forming mechanism may be employed in our present invention as a substitute or equivalent for the particular can body forming mechanism herein shown and described.

The carrier L is furnished with pockets L' to receive the can bodies as they are delivered from the conveyer K and with pivoted spring arms $L^2$ to retain the can body in the pockets of the carrier. The spring arms $L^2$ are held closed by springs $L^3$. The carrier L consists preferably of a revolving and reciprocating or oscillating bar mounted upon a pair of cranks $L^4$ which are actuated by segment gears $L^5 L^6$, $L^5 L^6$. The segment gears $L^6$ are connected by a rod $L^7$, and the right hand segment $L^6$ shown at Fig. 10 is operated by a pin or sliding block $L^8$ which works in the slotted arm $L^9$.

During the several subsequent operations the can bodies are held, sized and rounded to adapt them to properly receive the bottom and top heads and to undergo or withstand the wiring and beading operations by means of a series of can body holders or molds M M. The can body holders M are made in opening and closing parts, preferably each in two halves. The upper half of each mold is preferably made stationary and is formed in or secured to a pair of mold bars $m$, adjustably secured to the frame by screws $m'$. The lower half M' of each mold or can body holder is preferably mounted upon or formed in a corresponding pair of vertically reciprocating mold bars $m^2$, so that the molds may all be simultaneously opened and closed to permit the carrier L to deliver the can bodies successively from one can body holder to the succeeding one. The movable mold bar $m^2$ is carried by a pair of vertically reciprocating bars $m^3$ which slide in guides $m^4$ on the frame of the machine and are actuated through the connecting links $m^5$ by crank arms $m^6$ on the rock shaft $m^7$, which are vibrated by a cam $m^8$ on the shaft $m^9$, lever $m^{10}$ and connecting links $m^{11} m^{12}$.

The can body carrier L with its pockets L' and spring fingers $L^2$ for receiving and holding the can bodies fits and works between the parallel pairs of upper and lower mold bars $m m^2$ as is clearly shown in Figs 10 to 16 inclusive. The carrier L vibrates or swings forward and backward on its cranks $L^4$. At each forward movement or vibration of the carrier L each of its spring fingered can body pockets L' takes or carries a can body from one holder M M' to the next succeeding holder M M' in the bars $m m^2$, the bar $m^2$ being open or withdrawn from the bar $m$ during this forward oscillation of the carrier L, in order that the carrier may move the can body forward. The mold bar $m^2$ then closes thus clamping the can bodies in the series of holders M M' in said bars $m m^2$. While the can bodies are thus held firmly by the bars $m m^2$ the carrier L makes its backward oscillation, thus withdrawing the spring fingers $L^2$ from the can body just before carried forward and forcing the fingers upon the next succeeding can body similarly firmly held in the adjacent holder M M' of the bars $m m^2$. In other words, the bars $m m^2$ firmly clamp and support the series of can bodies while the fingers and pockets of the carrier L are withdrawing from one set of can bodies and receiving another; and the bars $m m^2$ are open while the carrier L moves the can bodies forward.

It will be observed that the can body conveyer K of the body forming mechanism delivers the can body directly under the first can body holder pocket M on the upper bar $m$, and that as the carrier L raises its pocket L' against the can body, the upper half of the can body holder M will keep the can body in place as the spring arms $L^2$ of the carrier L are forced open by contact with the can body. It will also be observed that the lower half M' of the can body holder is closed upon the can body when the can body has been conveyed by the carrier L into position, so that when the carrier L swings down and back to receive another can the can body holder M M' will support the can and thus cause the spring fingers $L^2 L^2$ to open and release it.

As will be seen from Fig. 10, the can body conveyer L is furnished with eight pockets or receptacles for the can bodies and the bars $m m^2$ are furnished with a series of eight can body holders, but only the right hand four of these can body holders and can body pockets in the carrier are necessarily used, the others being added simply for convenience of construction in combining the can body, wiring and beading devices with the can body forming device or its can body conveyer. The bottoms, or can heads for the bottom of the cans, are automatically fed down in position in front of the heading piston or plunger P through the can head feed chute or passage N. The can head feed chute N is furnished with a stop or device $n$ for releasing or discharging the last can head in the can head chute N, which is operated by the presence or absence of a can body in the preceding can body holder M M' by means of a trigger or sliding bar $n'$ against which the can body engages, if it is present, and which operates the stop or delivery device $n$ through the bent lever $n^2$. The bent lever $n^2$ is furnished with an arm $n^3$, which engages a spring actuated stop pin $n^4$. This stop pin $n^4$ serves to arrest the feed of the can heads through the feed chute N when the stop pin or feed device $n$ is withdrawn.

The can head applying plunger P is provided with a crimping die $p$ and with a flaring ring $p'$ adapted to pass over and embrace the end of the can body. The die $p$ is secured in a block $p^2$ attached to the heading plunger P. After the can head has thus been forced upon or applied to the can body, it is next crimped thereon by the action of the die $p$ in conjunction with the mandrel $p^3$, the end or face of which is furnished with a countering die $p^4$. The mandrel $p^3$ and the die $p^4$ are furnished with one or more longitudinal grooves $p^5 p^6$. One of these grooves $p^5$ is intended to receive the side seam $a^4$ of the can body and the other is for the purpose of permitting the ready escape of air from the interior of the can, as the plunger $p^3$ is inserted into the can and for the purpose of admitting air into the can as the plunger $p^3$ is withdrawn from the can after the crimping operation is completed. The plunger or piston P is reciprocated in its guide $P^2$ by means of an eccentric $P^3$ on the shaft $P^4$ and connecting link $P^5$. The plunger $p^3$ or the slide $P^6$ to which it is secured is reciprocated in the guide $P^7$ by means of a vibrating lever or wing $P^8$ which is actuated by a crank arm $P^9$ on the shaft $P^{10}$ through the connecting link $P^{11}$. After the bottom head has thus been applied and crimped upon the can body the carrier L delivers it to the next succeeding can body holder M M', by which succeeding holder the can is supported and sustained during the wiring and burnishing operations.

The wiring or turning of the mouth edge of the can body inward into a roll is done by means of a reciprocating and revolving mandrel Q carrying a wiring tool or roller $q$, having an annular groove $q'$ adapted to engage the mouth edge of the can body and turn it inward into a roll, as is clearly shown in Fig. 35. The wiring mandrel Q is also furnished with a ring $q^2$ to extend over and support the end of the can body during the wiring or rolling operation.

The burnishing of the raw edge of the flange of the can head bottom at the opposite end of the can is simultaneously effected by means of a revolving and reciprocating mandrel Q' furnished with a burnishing tool or roller $q^3$ which bears against the bottom of the can and operates not only to burnish or smooth the raw edge of the flange but also to complete the crimped seam which unites the bottom of the can to the can body, as is illustrated in Figs. 34 and 35, Fig. 34 showing the form of the seam and of the flange $a^7$ on the can body before the burnishing operation and Fig. 35 showing the same after the burnishing operation. The wiring mandrel or device Q is reciprocated in its guides or bearings $Q^2$ by means of an eccentric $Q^3$ on the shaft $Q^4$, which is connected to the revolving mandrel Q by means of a ball and socket joint $Q^5$ and link $Q^6$. The mandrel Q is revolved by means of gears $Q^7 Q^8$, shaft $Q^9$ and band wheel $Q^{10}$ and band $Q^{11}$. The burnishing mandrel Q' is reciprocated by means of cam $q^4$ on the shaft $P^4$ and the connecting slide $q^5$ and link $q^7$. The link $q^7$ has a swiveled connection $q^8$ with the revolving mandrel Q'. The mandrel Q' is revolved, in the opposite direction from the mandrel Q, by the gears $Q^{12} Q^{13}$, band wheel $Q^{14}$ and band $Q^{15}$. After the burnishing and rolling or wiring operations have been completed, the can body carrier L delivers the can to the next succeeding can body holder M M' where the beading operation is effected. The can body holder, which operates in conjunction or combination with the beading device, is furnished with an annular groove $r'$ to permit the beading roller $r$ to form the external bead $a^{10}$ in the can body. The beading roller $r$ is mounted upon or carried by a revolving and reciprocating mandrel R. The beading roller $r$ is moved radially in and out to bear against the interior of the can by means of a pivoted lever $r^2$ upon which the beading roller is journaled, which is actuated by a reciprocating wedge or cone $r^3$, which slides back and forth in the mandrel R. The wedge $r^3$ is reciprocated by a crank $r^4$ on the shaft $Q^4$ and connecting links $r^6$. A spring $r^7$ serves to retract the wedge or cone. The pivoted lever $r^3$ is also furnished with a retracting spring $r^8$. The beading mandrel R is reciprocated in its bearings $R^2$ by means of a connecting link $R^3$, lever $R^4$, link $R^5$, slide $R^6$ and operating cam $R^7$ on the shaft $P^{10}$. The link $R^3$ has a swivel connection with the mandrel R, as is shown in Figs. 25, 26, and 27. The mandrel R is revolved by means of gears $R^{10} Q^8$. During the beading operation the opposite end of the can is supported by a reciprocating plunger R' which is moved back and forth by means of the spring $R^{14}$ and cam $R^{12}$ and connecting link $R^{13}$. After the can has thus been beaded, it is next automatically delivered by the carrier to the next succeeding can body holder where the final head or slip cover $a^{11}$ is automatically applied or forced upon the can body. The slip covers $a^{11}$ are automatically delivered in front of the heading plunger or piston S through a can head delivery chute T. This can head delivery chute T is provided with can head discharge or stop devices $t\ t'$ carried by a vibrating lever $t^2$ which is operated by a lever $t^3$ through the connecting links $t^4$. This lever $t^3$ is operated by the can, if one is present in position, so that the can head delivery or discharge device will not permit the delivery of the can head unless there is a can body in position for it to be applied to.

During the heading operation the opposite end of the can body is supported to resist the thrust of the heading plunger S by means of a reciprocating piston S'. The heading piston S is reciprocated by the same mechanism which reciprocates the beading mandrel R, the lever R$^4$ being connected to the heading piston S by the link $s$. The supporting piston S' is reciprocated by means of a cam R$^{12}$ on the shaft P$^4$ through the connecting link R$^{13}$. At the next succeeding movement of the can body conveyer L, the can body is delivered into a discharge chute V, the initial portion of which is formed by inclines $v$ formed upon the can body holder or mold carrying bar or bars $m$.

It will be observed that the bars $m$ $m$, as well as the bars $m^2$ $m^2$ are made two in number, but each pair of bars are secured and operated together and are made of this duplicate construction simply for convenience and lightness of construction. The bottom head $a^5$ after entering the horizontal passage is pushed to the left along this horizontal portion of the feed chute by the feed slide $n^{10}$ and it is then pushed or fed downward by the slide $n^8$ into the passage or portion $n^9$ of the feed chute to the socket in the plunger P. The slide $n^{10}$ is operated by the link N$^2$, levers N$^5$ N$^6$, cam N$^7$ and spring N$^8$. The slide $n^8$ is operated from the levers N$^5$ N$^6$ by link N$^3$, lever N$^5$ and link $n^7$. The plunger $p^3$ is operated from the wing P$^8$ by the link P$^{12}$. The wing P$^8$ operates the shaft Q$^4$ to which it is connected. The can body is forced longitudinally into the socket formed by the beveled or flaring ring $p'$ of the plunger P by the shoulder P' on the mandrel $p^3$ which bears against the other end of the can body.

The device or conveyer for delivering the can bodies from the body former device or mechanism to the carrier L of the heading device or mechanism is provided with a means for preventing the turning of the can body on its own axis as it is conveyed, in order that the side seam $a^4$ of the body may properly register with the groove in the mandrel $p^3$ and die $p^4$. Motion is communicated from the main driving shaft B$^2$ to the shaft A$^4$ by sprocket chain A', sprocket wheel A$^2$ on the shaft B$^2$ and the sprocket wheel A$^3$ on the shaft A$^1$. The shaft $m^9$ is driven from the shaft A$^4$ by the gears A$^5$ A$^6$ A$^7$ A$^8$. The shaft P$^4$ is driven from the shaft $m^9$ by gears A$^9$ A$^{10}$. And the shaft P$^{10}$ is driven from shaft $m^9$ by gears A$^{11}$ A$^{12}$.

In the drawings we have shown the particular construction of the body former mechanism which we prefer to use, the particular construction of the device for heading and crimping the bottom on the can body which we prefer to use, the particular construction of wiring or edge rolling device which we prefer to use, the particular construction of burnishing device which we prefer to use, the particular construction of beading device which we prefer to use, and the particular construction of the device for applying the final head or top to the can, which we prefer to use, but it will be understood by those skilled in the art that other well known devices for accomplishing each of these operations, such for example as the prior devices for such purposes shown and described in the patents of the United States heretofore granted, may be used in practicing our invention as a substitute or equivalent for the devices which we have shown and described, and that our invention is not limited to any particular construction of any one or more of the devices which we have combined together to automatically produce the completed can.

The horizontal portion of the feed chute M is indicated in the drawings at $n^{15}$.

We claim—

1. The combination of the can body blank feeder, with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, a device for applying and crimping the bottom head upon the can body, a device for wiring or turning the mouth edge of the can body into a roll, a device for burnishing or smoothing the bottom end of the can body, a beading device and a device for applying the final or top head to the can body, substantially as specified.

2. The combination with a device or mechanism for forming the can body of a mechanism for automatically applying the head to the can body, comprising an opening and closing can body holder adapted to surround the can body for rounding and holding it, a plunger for forcing the can head upon the body and a device surrounding the plunger for centering the can head with the body, and a can body conveyer device for delivering the can body automatically from the can body former mechanism to the can body header mechanism, substantially as specified.

3. In an automatic can making machine, the combination with a can body former mechanism of an automatic can body header mechanism comprising an opening and closing mold for rounding and holding the can body, a plunger for forcing the head upon the body and a device surrounding the plunger for centering the head with the body as it is forced thereon, substantially as specified.

4. In an automatic can making machine, the combination with a can body former mechanism, of an automatic can body header mechanism comprising an opening and closing mold for rounding and holding the can body, a plunger for forcing the head upon the body and a device surrounding the plunger for centering the head with the body as it is forced thereon, and a chute for delivering the can head into said centering device in front of said plunger, substantially as specified.

5. The combination with a can body former horn and mechanism for forming the can body around the horn, of a can body header mechanism comprising an opening and closing can body holder, a plunger for forcing the can head upon the body, a device surrounding the plunger for centering the can head with the body and a can head delivery chute, and mechanism for automatically delivering the can bodies from said horn to said can body holder, substantially as specified.

6. In an automatic can making machine, the combination with a can body former device of a can body conveyer for delivering the can bodies therefrom, a series of opening and closing can body holders, a can body carrier for delivering the can bodies successively from one of said holders to another, substantially as specified.

7. The combination with a can body former device, of a can body conveyer, a guide or way along which the can bodies are moved, a device for preventing the can bodies from turning on their axes as they are conveyed along said way, a can body holder, a can head applying plunger and a reciprocating mandrel or plunger adapted to fit inside the can body and furnished with a longitudinal groove to register with the side seam of the can body, substantially as specified.

8. The combination with a series of opening and closing can body holders, of a can body carrier furnished with a series of pockets for receiving the can bodies and moving them successively from one of said holders to another, substantially as specified.

9. The combination with a series of opening and closing can body holders M M', the movable part or half M' of said holders being carried by a reciprocating bar $m^2$, of a can body carrier L having pockets L' and arms $L^2$, substantially as specified.

10. The combination with a pair of parallel bars $m$ $m$ furnished with a series of can body holders M of a pair of movable parallel bars $m^2$ $m^2$ furnished with a series of can holders M', a can body carrier L fitting between said parallel bars $m^2$ $m^2$ and provided with pockets L' and spring arms $L^2$ $L^2$, said carrier L having a vibrating crank movement backward and forward and operating to convey the can bodies successively from one of said holders to another, substantially as specified.

11. The combination with a can body holder of a can head feed chute, a can head applying plunger, a device surrounding the plunger for centering the can head with the can body in said holder, said can head applying plunger being furnished with a crimping die or face, and an inside fitting reciprocating mandrel or plunger furnished with a crimping die or face on its end, whereby the can heads or bottoms are automatically taken from said delivery chute and applied to or forced upon the can body and crimped or seamed thereto by one and the same operation, substantially as specified.

12. The combination with a can head feed chute or device, of a can head applying plunger furnished with a crimping die or face, a can body holder and an inside fitting reciprocating mandrel or plunger furnished with a crimping die or face on its end whereby the can heads or bottoms are automatically applied and crimped or seamed on the can body by one and the same operation, said can head applying plunger having also a flaring ring $p'$, substantially as specified.

13. The combination with a can head feed chute or device, of a can head applying plunger furnished with a crimping die or face, a can body holder and an inside fitting reciprocating mandrel or plunger furnished with a crimping die or face on its end whereby the can heads or bottoms are automatically applied and crimped or seamed on the can body by one and the same operation, said inside mandrel having a longitudinal groove, substantially as specified.

14. The combination with an opening and closing can body holder adapted to receive a can body, of a reciprocating mandrel furnished with a groove for the passage of air and provided with a crimping die or face and an opposing plunger provided with a crimping die or face, substantially as specified.

15. The combination with a can body holder of a can head feed chute, a can head applying plunger, a device surrounding the plunger for centering the can head with the can body in said holder, said can head applying plunger being furnished with a crimping die or face and an inside fitting reciprocating mandrel or plunger furnished with a crimping die or face on its end whereby the can heads or bottoms are automatically taken from said delivery chute and applied to or forced upon the can body and crimped or seamed thereto by one and the same operation, and a device for automatically delivering the can bodies to said holder, substantially as specified.

16. The combination with a two-part opening and closing can body holder for clamping the can body, of an inside reciprocating and axially revolving beading mandrel furnished with a radially movable beading tool or device, said mandrel reciprocating longitudinally in and out of the can body, substantially as specified.

17. The combination with a two-part opening and closing can body holder for clamping the can body, of an inside reciprocating and axially revolving beading mandrel furnished with a radially movable beading tool or device, said mandrel reciprocating longitudinally in and out of the can body, and a reciprocating wedge or device mounted in said mandrel for pressing the beading tool radially outward, substantially as specified.

18. The combination with a two-part opening and closing can body holder for clamping the can body, of an inside reciprocating and axially revolving beading mandrel furnished with a radially movable beading tool or device, said mandrel reciprocating longitudinally in and out of the can body, and a reciprocating wedge or device mounted in said mandrel for pressing the beading tool radially outward, said can body holder having an annular groove operating in conjunction with said beading tool, substantially as specified.

19. The combination with a two-part opening and closing can body holder for clamping the can body, of an inside reciprocating and axially revolving beading mandrel furnished with a radially movable beading tool or device, said mandrel reciprocating longitudinally in and out of the can body, and a reciprocating wedge or device mounted in said mandrel for pressing the beading tool radially outward, and a device for automatically feeding or delivering the can bodies to said can body holder, substantially as specified.

20. In an automatic can making machine, the combination with opening and closing can body holders, of a can body feed chute, a device for centering the can head in line with the can body, a can head applying plunger, and a revolving and longitudinally reciprocating mandrel furnished with a wiring or edge rolling tool, substantially as specified.

21. The combination with an opening and closing can body holder, of a can head feed chute, a device for centering the can head in line with the can body, and a can head applying plunger furnished with a crimping die, substantially as specified.

22. In an automatic can making machine, the combination with opening and closing can body holders, of a device for delivering the can bodies thereto, a can head feed chute, means for centering the can head in line with the can body, a can head applying plunger furnished with a crimping die, and a device for wiring or turning the edge of the open or mouth end of the can inward into a roll, substantially as specified.

23. In an automatic can making machine the combination with an opening and closing can body holder of a device for delivering the can bodies thereto, a revolving reciprocating mandrel furnished with a wiring or edge rolling tool and a revolving reciprocating mandrel furnished with a burnishing tool, said mandrels revolving in opposite directions, substantially as specified.

24. The combination with a series of opening and closing can body holders of a can body carrier furnished with a series of pockets for receiving the can bodies and moving them successively from one of said holders to another, a can head applying plunger furnished with a crimping die, an inside reciprocating mandrel furnished with an opposing die, and a revolving reciprocating mandrel furnished with an edge rolling or wiring tool, substantially as specified.

25. The combination with a series of opening and closing can body holders, of a can body carrier furnished with a series of pockets for receiving the can bodies and moving them successively from one of said holders to another, a can head applying plunger furnished with a crimping die, an inside reciprocating mandrel furnished with an opposing die, and a revolving reciprocating mandrel furnished with an edge rolling or wiring tool, and a second revolving reciprocating mandrel furnished with a burnishing or smoothing tool, substantially as specified.

26. The combination with a series of opening and closing can body holders of a can body carrier furnished with a series of pockets for receiving the can bodies and moving them successively from one of said holders to another, a can head applying plunger furnished with a crimping die, an inside reciprocating mandrel furnished with an opposing die, and a revolving reciprocating mandrel furnished with an edge rolling or wiring tool, and a revolving reciprocating mandrel furnished with a beading tool, substantially as specified.

27. The combination with a series of opening and closing can body holders of a can body carrier furnished with a series of pockets for receiving the can bodies and moving them successively from one of said holders to another, a can head applying plunger furnished with a crimping die, an inside reciprocating mandrel furnished with an opposing die, a revolving reciprocating mandrel furnished with an edge rolling or wiring tool, a revolving reciprocating mandrel furnished with a beading tool, and a can head feed device, and a piston or plunger for applying the final head or cover to the can, substantially as specified.

28. The combination with a device for applying a can-head to a can-body comprising a can-head-feed chute, an opening and closing can-body holder, a plunger and means for centering the can-head in line with the can-body, said plunger being furnished with a crimping die, an inside fitting reciprocating mandrel or plunger furnished with an opposing crimping die, and a device for wiring or turning the edge of the open or mouth end of the can inward into a roll, and a can body holder co-operating with said device for wiring or turning the edge of the can substantially as specified.

29. In an automatic can making machine the combination with an opening and closing can body holder of a can head chute, a can head applying plunger, a device surrounding the plunger for centering the can head in line with the can body, and a device for burnishing or smoothing the end of the can, substantially as specified.

30. The combination with an opening and closing can-body holder, of a can-head feed chute, a can-heading applying plunger, a device surrounding the plunger for centering the can-head in line with the can-body, said plunger being furnished with a crimping die, an inside fitting reciprocating mandrel or plunger furnished with an opposing crimping die, and a beading device, and a can body holder co-operating with said beading device substantially as specified.

31. The combination with two opening and closing can body holders of a can head feed chute, means for conveying the can body from one of said holders to the other, a can head applying plunger operating in conjunction with the first of said holders, and a second can head applying plunger operating in conjunction with the second of said holders and means for delivering and centering the can heads in line with the can bodies in front of said plungers, substantially as specified.

32. The combination with a device for applying the first or bottom head to the can body of a wiring or turning device and a separate device for applying the top or final head to the can body, and a can body carrier for conveying the can bodies between said devices, substantially as specified.

33. The combination with opening and closing can body holders, of a device for delivering the can bodies thereto, a can head delivering device, a device for centering the can head in line with the can body, a can head applying plunger, a wiring or edge turning device for turning the edge of the open or mouth end of the can into a roll, a second can head applying plunger and can head centering device for applying the top heads to the can body, and a device for feeding the top heads, substantially as specified.

34. In an automatic can making machine the combination of a device for applying the first or bottom head to the can body, comprising a can body holder, a plunger and a device surrounding the plunger for centering the head in line with the body, of an inside fitting mandrel and a separate device for applying the top or final head to the can body, substantially as specified.

35. The combination with an opening and closing can body holder, means for delivering the can bodies thereto, a can head applying plunger, a can head delivery chute, a device surrounding said plunger for centering the can head in line with the can body and a beading device, substantially as specified.

36. The combination with an opening and closing can body holder, means for delivering the can bodies thereto, a can head applying plunger, a can head delivery chute, a device surrounding said plunger for centering the can head in line with the can body, a beading device—and a can end burnishing or smoothing device, substantially as specified.

37. The combination with an opening and closing can body holder of a can body carrier for delivering the can bodies thereto, a can head applying plunger, a can head delivery chute, a device surrounding the plunger for centering the can head in line with the can body and a device for wiring or rolling the edge of the can, substantially as specified.

38. The combination with two or more opening and closing can body holders of a can body carrier for delivering the can bodies from one of said holders to the other, a can head applying plunger furnished with a crimping die or face, and an inside mandrel furnished with a crimping die or face, substantially as specified.

39. The combination with two or more opening and closing can body holders of a can body carrier for delivering the can bodies from one of said holders to the other, a can head feed chute or device, a can head applying plunger, and a wiring or edge rolling device, substantially as specified.

40. The combination with two or more opening and closing can body holders of a can body carrier for delivering the can bodies from one of said holders to the other, a can head feed chute or device, a can head applying plunger and a device for burnishing or smoothing the end of the can, substantially as specified.

41. The combination with two or more opening and closing can body holders of a can body carrier for delivering the can bodies from one of said holders to the other, a can head feed device or chute, a can head applying plunger, and a beading device, substantially as specified.

42. The combination with a series of can body holders, of a can body carrier, a can head feed device or chute, a can head applying plunger, a revolving reciprocating mandrel furnished with a wiring or edge rolling tool and a second can head applying plunger, substantially as specified.

43. The combination with a series of can body holders, of a can body carrier, a can head feed device or chute, a can head applying plunger, a revolving reciprocating mandrel furnished with a beading tool, and a second can head applying plunger, substantially as specified.

44. The combination with a series of can body holders, of a can body carrier, a can head feed device or chute, a can head applying plunger a revolving reciprocating mandrel, furnished with a burnishing or smoothing tool, and a second can head applying plunger, substantially as specified.

45. The combination with the opening and closing bars $m$ $m^2$ furnished with can body holders, said bar $m^2$ being also provided with incline $v$, of a can body carrier L, substantially as specified.

46. The combination with a can body holder of a can head applying plunger, a can head delivery chute N, having a horizontal portion $n^{15}$ and a vertical portion $n^9$, a horizontal feed slide $n^{10}$, and a vertical feed slide $n^8$, substantially as specified.

47. The combination with a can body holder of a can head applying plunger, a can head delivery chute N, having a horizontal portion $n^{15}$ and a vertical portion $n^9$, a horizontal feed slide $n^{10}$, a vertical feed slide $n^8$, feed stop $n$, lever $n^2$ and bar $n'$, adapted to be engaged and operated by the can body, substantially as specified.

48. The combination with a can body holder of a can head applying plunger, a can head feed chute, stop devices $n$ and $n^1$, bent lever $n^2$ having arm $n^3$ and bar $n'$, adapted to engage and be operated by the can body, substantially as specified.

49. The combination with a can body holder and a can body carrier, can head feed chute T, stop devices $t$ $t'$, lever $t^2$, bent lever $t^3$ adapted to engage the can bodies, and connecting link $t^4$, substantially as specified.

50. The combination with opening and closing bars $m$ $m^2$ furnished with a series of can body holders M M', of a can body carrier L, furnished with pockets L', and opening and closing arms L$^2$, and a can body carrier K for delivering the can bodies to said carrier L, substantially as specified.

51. The combination with a can body holder of a can head feed chute or device, a reciprocating can head piston P furnished with block $p^2$, die $p$, flaring ring $p'$, and a reciprocating inside plunger $p^3$ furnished with die $p^4$ and shoulder P', substantially as specified.

52. The combination of the can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, substantially as specified.

53. The combination of the can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, and a device for applying and crimping the bottom head upon the can body, substantially as specified.

54. The combination of the can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, and a device for applying and crimping the bottom head upon the can body, and a device for wiring or turning the mouth edge of the can body into a roll, substantially as specified.

55. The combination of the can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, a device for applying and crimping the bottom head upon the can body, a device for wiring or turning the mouth edge of the can body into a roll, and a device for burnishing or smoothing the bottom end of the can body, substantially as specified.

56. The combination of the can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, and a device for applying and crimping the bottom head upon the can body, a device for wiring or turning the mouth edge of the can body into a roll, a device for burnishing or smoothing the bottom end of the can body, and a beading device, substantially as specified.

57. The combination of the can body blank feeder with a device or mechanism for forming the can body and folding the meeting edges of the blank into a seam, a conveyer for delivering the can body from the can body forming mechanism, a transverse can body carrier, a series of opening and closing can body holders to which the cans are successively delivered by said transverse carrier, and a device for automatically applying the can head to the body substantially as specified.

58. The combination of the can body blank feeder with a device or mechanism for forming the can body and folding the meeting edges of the blank into a seam, a conveyer for delivering the can body from the can body forming mechanism, a transverse can body carrier, a series of opening and closing can body holders to which the cans are successively delivered by said transverse carrier, and a device for applying and crimping the bottom head upon the can body, substantially as specified.

59. The combination of the can body blank feeder with a device or mechanism for forming the can body and folding the meeting edges of the blank into a seam, a conveyer for delivering the can body from the can body forming mechanism a transverse can body carrier, a series of opening and closing can body holders to which the can bodies are successively delivered by said transverse carrier, a device for applying and crimping the bottom head upon the can body, and a device for wiring or turning the mouth edge of the can body into a roll, substantially as specified.

60. The combination of the can body blank feeder with a device or mechanism for forming the can body and folding the meeting edges of the blank into a seam, a conveyer for delivering the can body from the can body forming mechanism a transverse can body carrier, a series of opening and closing can body holders to which the can bodies are successively delivered by said transverse carrier, a device for applying and crimping the bottom head upon the can body, a device for wiring or turning the mouth edge of the can body into a roll, and a device for burnishing or smoothing the bottom end of the can body, substantially as specified.

61. The combination of the can body blank feeder with a device or mechanism for forming the can body and folding the meeting edges of the blank into a seam, a conveyer for delivering the can body from the can body forming mechanism a transverse can body carrier, a series of opening and closing can body holders to which the can bodies are successively delivered by said transverse carrier, a device for applying and crimping the bottom head upon the can body, a device for wiring or turning the mouth edge of the can body into a roll, and a beading device, substantially as specified.

62. The combination of the can body blank feeder with a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, a device for applying and crimping the bottom head upon the can body, a device for wiring or turning the mouth edge of the can into a roll, a beading device, and a device for applying the final or top head to the can, substantially as specified.

63. In an automatic can making machine, the combination with a feeding table or guideway along which the can body blanks may be fed, of a corner clipping device, two pairs of edge folding or hook forming devices for forming oppositely turned hooks upon the edges of the sheet blank, a can body former horn, an opening and closing can body holder, mechanism for delivering the can bodies from said horn to said holder, a device for centering the can head in line with the can body, a can head feed device and a can head applying plunger, substantially as specified.

64. In an automatic can making machine, the combination with a corner clipping device of edge folding or hook forming devices, a can body former horn, mechanism for forming the can body around the horn, mechanism for interlocking the edge folds or hooks and compressing the same into a seam, a device for feeding the blanks, and a device for delivering the formed can bodies from the horn, substantially as specified.

65. In an automatic can making machine, the combination of the following instrumentalities: a mechanism for feeding the blanks, a mechanism for forming hooks or edge folds on the blanks, a can body former horn, a mechanism for forming the can body around the horn, a mechanism for interlocking and pressing into a seam the hooks or edge folds, an opening and closing can body holder adapted to surround the can body for rounding and holding it, a mechanism for delivering the can body from the horn to said holder, a device for centering the can head in line with the can body, and a can head applying plunger, substantially as specified.

66. In an automatic can making machine, the combination of the following instrumentalities: a mechanism for feeding the blanks, a mechanism for forming hooks or edge folds on the blanks, a can body former horn, a mechanism for forming the can body around the horn, a mechanism for interlocking and pressing into a seam the hooks or edge folds, an opening and closing can body holder adapted to surround the can body for rounding and holding it, a mechanism for delivering the can body from the horn to said holder, a device for centering the can head in line with the can body, and a can head applying plunger and a device for delivering the can heads, substantially as specified.

67. The combination with a can body former horn, with mechanism for forming the can body around the horn, a device for squeezing or pressing the interlocked hooks or edge folds into a seam, an opening and closing mold for rounding and holding the can body, a device for centering the can head in line with the body, and a device for forcing the head and body together, substantially as specified.

68. The combination with a can body former horn, with mechanism for forming the can body around the horn, a device for squeezing or pressing the interlocked hooks or edge folds into a seam, an opening and closing mold for rounding and holding the can body, a device for centering the can head in line with the body, and a device for forcing the head and body together, and means for delivering the can bodies from said horn to said opening and closing mold, substantially as specified.

69. The combination with a can body former horn, with mechanism for forming the can body around the horn, a device for squeezing or pressing the interlocked hooks or edge folds into a seam, an opening and closing mold for rounding and holding the can body, a device for centering the can head in line with the body, a device for forcing the head and body together, means for delivering the can bodies from said horn to said opening and closing mold, and a device for delivering the can head into said centering device, substantially as specified.

70. In an automatic can making machine, the combination with a can body former horn, of mechanism for forming the can body around the horn, a device for squeezing or compressing into a seam the interlocked hooks or edge folds, a series of opening and closing can body holders, each adapted to surround the can body and round and hold it, mechanism for delivering the can bodies from said horn to the first of said holders, and a can body carrier for delivering the can bodies successively from one of said holders to another, substantially as specified.

71. The combination with a can body former horn, a device for closing or compressing the interlocked hooks or edge folds against the horn, a can body conveyer for delivering the can bodies from the horn to the opening and closing can body holder, a can body holder, a can head feed chute, a can head applying plunger, a device surrounding the plunger for centering the can head with the can body in said holder, said can head applying plunger being furnished with a crimping die or face, and an inside fitting reciprocating mandrel or plunger furnished with a crimping die or face on its end, whereby the can heads or bottoms are automatically taken from said delivery chute and applied to or forced on the can body and crimped or seamed thereto by one and the same operation, substantially as specified.

72. The combination with a can body former horn, mechanism for forming the can body around the horn, mechanism for interlocking and compressing into a seam the hooks or edge folds, a device for delivering the can body from the horn, a can body holder, a can head feed chute, a can head applying plunger, a device surrounding the plunger for centering the can head with the can body in said holder, said can head applying plunger being furnished with a crimping die or face and an inside fitting reciprocating mandrel or plunger furnished with a crimping die or face on its end whereby the can heads or bottoms are automatically taken from said delivery chute and applied to or forced upon the can body and crimped or seamed thereto by one and the same operation, and a device for automatically delivering the can bodies to said holder, substantially as specified.

73. The combination with a can body former horn, mechanism for forming the can body around the horn, a device for compressing or squeezing into a seam the interlocked hooks or edge folds, an opening and closing can body holder, means for delivering the can bodies thereto, a can head applying plunger, a can head delivery chute, a device surrounding said plunger for centering the can head in line with the can body, and a beading device, substantially as specified.

74. The combination with a can body former horn, mechanism for forming the can body around the horn, a device for compressing or squeezing into a seam the interlocked hooks or edge folds, an opening and closing can body holder, means for delivering the can bodies thereto, a can head applying plunger, a can head delivery chute, a device surrounding said plunger for centering the can head in line with the can body, a beading device, and a can end burnishing or smoothing device, substantially as specified.

75. The combination with a can body former horn, mechanism for forming the can body around the horn, a device for compressing or squeezing into a seam the interlocked hooks or edge folds, an opening and closing can body holder of a can body carrier for delivering the can bodies thereto, a can head applying plunger, a can head delivery chute, a device surrounding the plunger for centering the can head in line with the can body and a device for wiring or rolling the edge of the can, substantially as specified.

76. The combination with a can body former horn, mechanism for forming the can body around the horn, a device for compressing or squeezing into a seam the interlocked hooks or edge folds, two or more opening and closing can body holders, a can body carrier for delivering the can bodies from one of said holders to the other, a can head applying plunger furnished with a crimping die or face, and an inside mandrel furnished with a crimping die or face, substantially as specified.

77. The combination with a can body former horn, mechanism for forming the can body around the horn, a device for compressing or squeezing into a seam the interlocked hooks or edge folds, two or more opening and closing can body holders, a can body carrier for delivering the can bodies from one of said holders to the other, a can head feed chute or device, a can head applying plunger, and a wiring or edge rolling device, substantially as specified.

78. The combination with a can body former horn, mechanism for forming the can body around the horn, a device for compressing or squeezing into a seam the interlocked hooks or edge folds, of two or more opening and closing can body holders, a can body carrier for delivering the can bodies from one of said holders to the other, a can head feed chute or device, a can head applying plunger and a device for burnishing or smoothing the end of the can, substantially as specified.

79. The combination with a can body former horn, mechanism for forming the can body around the horn, a device for compressing or squeezing into a seam the interlocked hooks or edge folds, two or more opening and closing can body holders, a can body carrier for delivering the can bodies from one of said holders to the other, a can head feed device or chute, a can head applying plunger, and a beading device, substantially as specified.

80. The combination of a can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, a device for centering the can head in line with the can body, a device for delivering the can heads thereto, and a can head applying plunger, substantially as specified.

81. The combination of the can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, and a device for applying and crimping the bottom head upon the can body, comprising a plunger furnished with a crimping die, and a device for centering the can head in line with the can body, substantially as specified.

82. The combination of the can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, a device for centering the can head in line with the body, and a device for applying and crimping the bottom head upon the can body, and a device for wiring or turning the mouth edge of the can body into a roll, substantially as specified.

83. The combination of the can body blank feeder with a device for clipping the corners of the blank, a device or mechanism for forming the can body and folding the meeting edges of the blank into a seam, a conveyer for delivering the can body from the can body forming mechanism, a transverse can body carrier, a series of opening and closing can body holders to which the can bodies are successively delivered by said transverse carrier, a device for centering the can head in line with the body, a device for applying and crimping the bottom head upon the can body, a device for wiring or turning the mouth edge of the can body into a roll, and a device for burnishing or smoothing the bottom end of the can body, substantially as specified.

84. The combination with the can body blank feeder with a device or mechanism for forming the can body and folding the meeting edges of the blank into a seam, a conveyer for delivering the can body from the can body forming mechanism, a transverse can body carrier, a series of opening and closing can body holders to which the cans are successively delivered by said transverse carrier, a device for centering the can head in line with the body, and a device for automatically applying the can head to the body, substantially as specified.

85. In an automatic can making machine, the combination of a can body forming horn, of mechanism for closing or compressing into a seam the interlocked hooks or edge folds and mechanism for applying the head to the can body, and mechanism for crimping or securing the head upon the body, substantially as specified.

86. In an automatic can making machine, the combination of a can body forming horn, of mechanism for closing or compressing into a seam the interlocked hooks or edge folds and mechanism for applying the head to the can body and mechanism for crimping or securing the head upon the body, and mechanism for forming a bead near the top of the can body, substantially as specified.

EDWIN NORTON.
FRANK M. LEAVITT.

Witnesses as to the signature of Edwin Norton:
O. W. NORTON,
W. L. GIFFORD.

Witnesses as to the signature of Frank M. Leavitt:
DENNIS JUDGE,
FRANK C. B. PAGE.